(12) United States Patent
Hood

(10) Patent No.: US 8,868,489 B2
(45) Date of Patent: Oct. 21, 2014

(54) METHOD AND SYSTEM FOR GENERATING COLLABORATIVE CONTENT

(75) Inventor: Padraig Hood, London (GB)

(73) Assignee: Codigital Limited (GB)

( * ) Notice: Subject to any disclaimer, the term of this patent is extended or adjusted under 35 U.S.C. 154(b) by 571 days.

(21) Appl. No.: 13/376,991

(22) PCT Filed: Jun. 8, 2010

(86) PCT No.: PCT/GB2010/050958
§ 371 (c)(1),
(2), (4) Date: Feb. 9, 2012

(87) PCT Pub. No.: WO2010/142982
PCT Pub. Date: Dec. 16, 2010

(65) Prior Publication Data
US 2012/0130954 A1    May 24, 2012

(30) Foreign Application Priority Data
Jun. 8, 2009 (GB) .................................. 0909844.3

(51) Int. Cl.
*G06F 17/30* (2006.01)
*G06Q 10/10* (2012.01)

(52) U.S. Cl.
CPC ..................................... *G06Q 10/10* (2013.01)
USPC ............. 707/608; 705/300; 705/301; 706/45; 715/751

(58) Field of Classification Search
CPC ... G06Q 10/10; G06Q 10/101; G06Q 10/103; G06Q 10/109
See application file for complete search history.

(56) References Cited

U.S. PATENT DOCUMENTS

| 5,890,177 | A | 3/1999 | Moody et al. |
| 2002/0051958 | A1* | 5/2002 | Khalsa ........................... 434/238 |
| 2006/0218004 | A1* | 9/2006 | Dworkin et al. .................. 705/1 |
| 2007/0282666 | A1* | 12/2007 | Afeyan et al. ................... 705/10 |
| 2008/0059891 | A1* | 3/2008 | Herzog .......................... 715/751 |

(Continued)

FOREIGN PATENT DOCUMENTS

WO   WO 2008/093363 A2    8/2008

OTHER PUBLICATIONS

"A Comparison of Optimistic Approaches to Collaborative Editing of Wiki Pages," by Molli et al. In: Collaborative Computing: Networking, Applications and Worksharing (2007). Available at: IEEE.*

(Continued)

*Primary Examiner* — Daniel Kinsaul
(74) *Attorney, Agent, or Firm* — Hovey Williams LLP

(57) ABSTRACT

A method and system for users to concurrently edit a digital file to achieve a predetermined goal. Each iteration creates a copy of the digital file for each user; enables the users to create an altered digital file by making a change having a magnitude within predetermined limits; creates a voting set containing a plurality of digital files, the plurality of digital files including at least one altered or unaltered digital file; enables the users to cast votes in relation to the digital files in the voting set; repeats the steps of creating a voting set and enables the users to cast votes until one of the digital files in one of the voting sets receives a number of votes above a predetermined voting threshold; and includes in the next iteration the digital file which received a number of votes above the predetermined voting threshold.

15 Claims, 31 Drawing Sheets

(56) References Cited

U.S. PATENT DOCUMENTS

| | | | | |
|---|---|---|---|---|
| 2008/0059991 | A1* | 3/2008 | Romano | 725/19 |
| 2008/0250331 | A1* | 10/2008 | Tulshibagwale | 715/751 |
| 2009/0196570 | A1* | 8/2009 | Dudas et al. | 386/52 |
| 2009/0199090 | A1* | 8/2009 | Poston et al. | 715/255 |
| 2010/0010989 | A1* | 1/2010 | Li et al. | 707/5 |
| 2010/0257457 | A1* | 10/2010 | De Goes | 715/751 |

OTHER PUBLICATIONS

"A Program Plagiarism Detection Model Based on Information Distance and Clustering," by Zhang et al. In: Int'l Conf. Intelligent Pervasive Computing (2007). Available at: IEEE.*

"MeasuringWikipedia2005," by Voss, Jakob. In: Humbolt-U. Berlin—Accepted paper for Proc. ISSI 2005 Conf. (2005). Available at: http://eprints.rclis.org/6207/1/MeasuringWikipedia2005.pdf.*

Notification of Transmittal of the International Search Report and the Written Opinion of the International Searching Authority, or the Declaration dated Sep. 20, 2010; International Application No. PCT/GB2010/050958; International Filing Date: Jun. 8, 2010; Applicant: Codigital Limited.

Hu, Bo et al.; "How Recent is a Web Document?;" Electronic Notes in Theoretical Computer Science, Elsevier Lnkd; vol. 157; Date: May 22, 2006; pp. 147-166, XP025123888; ISSN: 1571-0661.

Tran, Nicholas; "The Normalized Compression Distance and Image Distinguishability;" Proceedings of the International Society for Optical Engineering (SPIE), SPIE, USA LNKD; vol. 6492; Date: Feb. 15, 2007; pp. 64921D-1, XP002528417; ISSN: 0277-786X.

Vitanyi P; "Universal Similarity;" Information Theory Workshop, 2005 IEEE Aug. 29-Sep. 1, 2005, Piscataway, NJ, USA, IEEE LNKD; Date: Aug. 29, 2005; pp. 227-232, XP010852573; ISBN: 978-0/7803-9480-3.

Chen, Xin et al; "The Similarity Metric;" IEEE Transactions on Information Theory, IEEE, US LNKD; vol. 50, No. 12; Date: Dec. 1, 2004; pp. 3250-3264, XP011122866; ISSN: 0018-9448.

* cited by examiner

Iteration 1
Editing Phase (30 seconds)
| Unchanged Image / Starting Image (U)  | |
|---|---|
| Edit A (20% Edited)  | Edit C (20% Edited)  |
| Edit B (20% Edited)  | Edit D (20% Edited)  |
Voting Phase (30 seconds)
| Choice 1 | Choice 2 | Voter A | Voter B | Voter C | Voter D |
|---|---|---|---|---|---|
|  |  | U | U | A | U |
|  |  | B | B | B | U |
|  |  | U | C | C | C |
|  |  | D | D | D | D |
|  |  | B | A | B | B |
|  |  | C | C | A | A |
|  |  | A | D | D | D |
|  |  | C | C | B | B |
|  |  | D | D | B | D |
|  |  | C | D | D | C |
Voting Result Summary
| | Voting Success |
|---|---|
| Unchanged Image (U) | 31.25% |
| Edit A | 31.25% |
| Edit B | 56.25% |
| Edit C | 56.25% |
| Edit D | 75.00% |
Edit D, the winner on 75%
Figure 15A

Iteration 1 Evolution Phase to be communicated to main display and all mobile devices:

Stats to be displayed on main display and all mobile devices:
1 Iteration
4 Edits
40 Votes

Contribution By Editor

| Editor | Running Contribution |
|---|---|
| Unknown | 80% |
| Editor A | 0% |
| Editor B | 0% |
| Editor C | 0% |
| Editor D | 20% |

Iteration 2
Editing Phase (30 seconds)
| Unchanged Image (U)  | |
|---|---|
| Edit A (20% Edited)  | Edit C (20% Edited)  |
| Edit B (20% Edited) 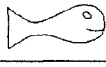 | Edit D (20% Edited) 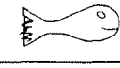 |
Voting Phase (30 seconds)
| Choice 1 | Choice 2 | Voter A | Voter B | Voter C | Voter D |
|---|---|---|---|---|---|
|  | 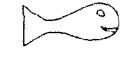 | U | A | A | U |
|  |  | B | B | B | U |
|  | 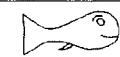 | U | C | C | C |
| 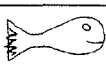 | 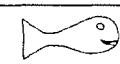 | D | D | D | D |
| 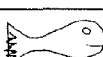 | 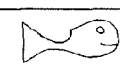 | B | A | B | B |
| 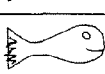 |  | C | C | A | A |
|  |  | A | D | D | D |
| 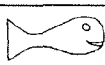 | 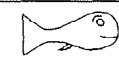 | C | B | B | B |
| 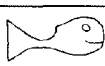 | 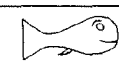 | B | B | B | D |
|  |  | C | D | D | C |
Voting Result Summary
| | Voting Success |
|---|---|
| Unchanged Image (U) | 25.00% |
| Edit A | 37.50% |
| Edit B | 75.00% |
| Edit C | 50.00% |
| Edit D | 62.50% |
Edit B, the winner on 75%
Figure 16A

Iteration 2 Evolution Phase to be communicated to main display and all mobile devices:

Stats to be displayed on main display and all mobile devices:
2 Generations
8 Edits
80 Votes

Contribution By Editor

| Editor | Running Contribution |
|---|---|
| Unknown | 64% |
| Editor A | 0% |
| Editor B | 20% |
| Editor C | 0% |
| Editor D | 16% |

ADD CONTENT ITEM SCREEN  500

Objective: What would your ideal Amex Gold Card world be like?

Please type in the box below to achieve the objective (max 500 chars)

Characters: 0
Max: 500

SUBMIT   RESET   CANCEL

Figure 19

EDIT CONTENT ITEM SCREEN  600

Objective: What would your ideal Amex Gold Card world be like?

Please edit the text below to achieve the objective
(max 500 chars or a change of 20%)

Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo. Nemo enim ipsam voluptatem quia voluptas sit aspernatur aut odit aut fugit, sed quia consequuntur magni dolores eos qui ratione voluptatem sequi nesciunt.

Change: 0%    Characters: 0
Max: 20%      Max: 500

SUBMIT   RESET   CANCEL

Figure 20

EDIT VOTING SCREEN 700

Objective: What would your ideal Amex Gold Card world be like?

Choose the version that best fits the objective

Sed ut perspiciatis unde omnis iste natus error sit voluptatem accusantium doloremque laudantium, totam rem aperiam eaque ipsa quae ab illo inventore veritatis et quasi architecto beatae vitae dicta sunt explicabo. Nemo enim ipsam voluptatem quia voluptas sit aspernatur aut odit aut fugit, sed quia consequuntur magni dolores eos qui ratione voluptatem sequi nesciunt.

OR

Sed ut perspiciatis unde omnis iste natus error sit voluptatem accusantium doloremque laudantium, totam , eaque ipsa quae ab illo inventore veritatis et quasi architecto beatae vitae dicta sunt explicabo. Nemo enim ipsam voluptatem quia voluptas sit aspernatur aut odit aut fugit, sed quia consequuntur magni dolores eos qui ratione voluptatem sequi nesciunt.

CANCEL

Figure 23

EDIT VOTING EFFECT SCREEN
710

Thank you for your vote
You have just voted for edit 1 of item #34

| Edit 1 | Edit 2 | Edit 3 |
|---|---|---|
| Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo. | Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo. | Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo. |
| 4/5 - Winner | 3/5 | 1/5 |

Edit 1 has won this iteration and will be promoted as the live version of this content item
You voting for this item has a consistency rating of 70% with other users

VOTE AGAIN>>   CANCEL

Figure 24

METHOD AND SYSTEM FOR GENERATING COLLABORATIVE CONTENT

RELATED APPLICATIONS

This is a national stage application under 35 U.S.C. §371 of International Application No. PCT/GB2010/050958, filed 8 Jun. 2010, which claims priority from United Kingdom Application No. 0909844.3, filed 8 Jun. 2009. The disclosures of the above-referenced applications are hereby incorporated by reference in their entirety.

This invention generally relates to the generation of collaborative content and more particularly to an iterative method for coherent, goal directed, collaborative editing.

The invention further relates to a system for and process of collective decision making which can be used for developing new product ideas, consumer research, and design iteration through direct public participation.

Collaborative editing is the practice of groups producing content together through individual contributions. Existing tools for generating collaborative content range from real-time whiteboards and document editors to wikis, crowdsourcing platforms and evolutionary design tools.

Real-time collaborative editors allow multiple users to edit the same content at the same time, immediately engaging the participants in real-time ("live") collaboration. One example of an existing real-time collaborative editor is Google Docs, a Web-based word processor, spreadsheet, presentation, and form application. Google Docs allows users to create and edit documents online while collaborating in real-time with other users. Other increasingly popular real-time collaborative editors include image editing applications such as NetSketch, a real-time drawing application for the Apple iPhone, and GE's Imagination Cubed, a collaborative whiteboard that enables real-time drawing on the Web. Real-time collaborative editors are faced with several technical challenges which limit the coherence of the collaborative effort. One difficulty is that the edits are applied immediately without any form of checking. This results in simultaneous conflicting edits being rendered which often need to be corrected. The problem is further exacerbated by network lag which can delay the rendering of changes. Many real-time collaborative editors provide communication tools such as chat and instant messaging to facilitate coordinated behaviour. However, while the chat facilities work well with a limited number of users, they do not scale well with large numbers and the collaboration often ends up being dominated by one or a few users.

Wikis are collaborative websites where users can create and edit pages on any topic. The amount that a user can change is usually unlimited and, much like collaborative real-time editors, the coherence and integrity of the content has to be coordinated by the users themselves and a significant effort is required to correct inconsistencies between disparate edits. Wikipedia, the largest online encyclopaedia, is sometimes moderated by specially selected human editors to control the large numbers of conflicting and sometimes inappropriate edits. Human moderation has the disadvantage that it is slow, and dependent on the judgement of a select group of individuals.

Many existing collaborative editing systems such as Wikipedia have no restriction on how much can be edited. Having no limit to the size of the edit leads to significant scope for the collaborative edit to be dominated by a few users. However, all existing approaches to controlling the size of the edit have significant drawbacks.

For example, systems have been proposed which restrict the edit to a predefined segment (or section or line; e.g. the method and system for creating a collaborative work over a digital network disclosed in U.S. Pat. No. 7,603,626). However, in such systems, cross-segment edits are impossible and edited segments can become inconsistent with each other, therefore requiring further correction work or coordination between users.

Some systems impose an absolute edit limit such as a certain number of character operations, number of lines edited, pixels drawn or a time limit.

However, in systems where the edit is restricted to an absolute amount (e.g. number of characters/pixels), there is significant inconsistency between what is allowable and what is not. Some intuitively small edits are impossible and some intuitively large edits are allowed (see an image editing example in FIG. 1A and a text editing example in FIG. 1C), while edits of the same absolute amount can have a significantly differently impact depending on what part of the content is edited (FIG. 1B). In many cases, information is not evenly distributed throughout the content (i.e. it is more complex in some parts than in others), so changing some parts by an absolute amount is intuitively more significant than changing other less complex parts.

Furthermore, imposing a time limit clearly penalises slow editors more than fast editors.

Therefore, there exists a technical challenge in controlling the edits so that they are consistent in degree regardless of the type of edit attempted and the type of content. The control mechanism should fairly assess any edit operation (e.g. insert, cut, paste, rotate, skew etc) and should be sensitive to relative changes of complexity in the content.

Accordingly, there is a need for an easy-to-use collaborative editing system to generate coherent goal directed content with representative, consistent, participation. Such a tool should support large numbers of remote contributors without any need for direct communication or human moderation and should be able to progress synchronously or asynchronously.

Furthermore, the method should be applicable to any type of content, should enable any editing function on any part of the content and should not require the content to be arbitrarily segmented in any way.

The present invention seeks to provide a system and method to overcome the problems associated with the prior art.

According to the present invention there is provided an iterative method for a plurality of users to concurrently edit at least one digital file to achieve a predetermined goal, each iteration comprising the steps of:

creating a copy of the at least one digital file for each user;

enabling at least one user to create at least one altered digital file by making a change to the copy of the at least one digital file, wherein the magnitude of the change is within predetermined limits;

creating a voting set containing a plurality of digital files, the plurality of digital files including at least one altered digital file or at least one unaltered digital file;

enabling at least one user to cast a vote in relation to the digital files in the voting set;

repeating the steps of creating a voting set and enabling at least one user to cast a vote until at least one of the digital files in one of the voting sets receives a number of votes above a predetermined voting threshold; and including in the next iteration the at least one digital file which received a number of votes above a predetermined voting threshold;

wherein the predetermined limits of the magnitude of change are determined by a distance metric, the distance metric being a function of an estimation of the information distance between the unedited and edited state of the at least one digital file.

According to the present invention there is also provided a system for a plurality of users to concurrently and iteratively edit at least one digital file to achieve a predetermined goal, the system comprising:

means for creating a copy of the at least one digital file for each user;

means for enabling at least one user to create at least one altered digital file by making a change to the copy of the at least one digital file, wherein the magnitude of the change is within predetermined limits;

means for creating a voting set containing a plurality of digital files, the plurality of digital files including at least one altered digital file or at least one unaltered digital file;

means for enabling at least one user to cast a vote in relation to the digital files in the voting set; and means for identifying the digital files which receive a number of votes above a predetermined voting threshold;

wherein the predetermined limits of the magnitude of change are determined by a distance metric, the distance metric being a function of an estimation of the information distance between the unedited and edited state of the at least one digital file.

The present invention is directed to generating coherent goal directed collaborative content (e.g. images, text, video, audio, or rich media). For example, a goal for visual content could be the '2012 Olympic Games Logo Design', using a graphics widget as an editing tool. A goal for textual content could be 'What would your ideal Amex Gold Card world be like?', using a text editing widget as an editing tool. A goal for musical audio content could be the 'Ultimate tea break tune', using a music editing widget as an editing tool.

The present invention is an iterative process of editing and voting which allows a content item to develop and evolve towards a stated goal. Edits to a content item (e.g. an image or a passage of text) are submitted and voted on for which is the best fit for the goal. The winning edit or edits survive and the remaining edits are discarded. Further edits are then received and the next iteration begins. Edits are always assessed against all other edits for the content item as a whole—this ensures integrity is maintained across the whole of the content and eliminates the possibility of inconsistent concurrent edits going live. An unchanged copy of the content is assessed alongside all submitted edits to cater for a situation where none of the proposed edits is considered an improvement. The general form of the competing edits is shown in FIG. 2.

An edit can be attempted on any part of the content with any editing function (e.g. insert, delete, cut/paste, rotate).

The system will only allow the edit if it is within predetermined limits. Preferably, the predetermined limits are determined by a distance (or similarity) metric. The distance metric assesses the difference in degree between the original state of the content and the proposed state of the content, ranging from 100% identical (0) to 100% different (1). Imposing a restriction on how much can be edited ensures the content develops smoothly rather than taking great leaps. The limitation on the size of the edit delivers a degree of control much like the limited mutation rate in genetic algorithms.

Preferably, the predetermined limits of the magnitude of change according to the present invention are a function of an estimation of the information distance between the edited and unedited state of the at least one digital file.

Measuring the difference between two items of digital content is a well known challenge in computer science. It is computationally expensive even in the simplest cases and therefore requires a computer processor and associated interlaces to implement.

When assessing the amount of change to any item of digital content, it is possible to represent the content as a string and to make use of existing string distance metrics. There are many string distance metrics that could be used to assess the difference between two strings. These include Hamming distance, Levenshtein distance, Jaro-Winkler distance, Soundex, Fuzzy matching, Compression distance, semantic distance and many more.

String distance metrics are used in many applications such as file/image clustering, plagiarism detection, gene expression analysis, fraud detection, fingerprint analysis, ontology merging, data deduplication or Web interfaces, e.g. Ajax-style suggestions as you type.

The simplest of the string distance metrics, Hamming distance, is the easiest to compute but has the limitation that the two strings being compared need to be the same length and often does not provide intuitive results. Hamming distance compares each character of one string with the corresponding character of the other string and assesses how many of the characters are different. It cannot intelligently identify two strings as being similar if they have common characters but they are in different positions. As such it is not at all suitable as a distance metric in the current invention.

Levenshtein distance is another commonly used metric but, like Hamming distance, does not give intuitive results when a segment of characters are the same but in a different position. Each character is assessed in isolation and not in relation to its neighbours. Levenshtein distance is not a practical method to compare longer strings as the computational cost to compute it is proportional to the product of the two string lengths (i.e. a quadratic relationship).

In the present invention, it is important that movements and rearrangements of substrings are assessed intuitively as these are common edit operations (e.g. cut and paste). For example, when editing a textual content item, changing the order of bullet points should be considered a relatively small change compared to changing the specific wording of the bullets. Or, when editing an image content item, rotating a shape should be considered a smaller change than changing the intrinsic nature of the shape itself.

It is also important that the method of assessing the amount of change is responsive to the concentration of information in the content. For example, in FIG. 1B, editing the complex top part of the image should be considered a greater change than changing the same number of pixels on the more simple bottom half. Similarly, in FIG. 1A, moving the image should be considered a small change, despite the fact that all the black pixels have changed.

The better string distance metrics are more computationally expensive but it is important that the computational expense should not grow exponentially with the length of the string (like the Levenshtein distance) as this imposes a restriction on the size of the possible content items.

A good choice of methodology for assessing content differences is the Normalized Compression Distance. Preferably, the predetermined limits of the magnitude of change according to the present invention are a function of the Normalized Compression Distance between the edited and unedited state of the at least one digital file.

The Normalized Compression Distance exploits the properties of file compressibility to estimate the Information Distance between two digital files. It is important that the chosen metric is normalized, i.e. given a value between 0 and 1, to enable edits of different absolute amounts to be compared relatively.

Compression algorithms like gzip, bzip2 and PPMZ are increasingly used to approximate the amount of information in a digital file. The amount of information in a digital file, in an information theory sense, is equivalent to the amount of inherent complexity (known as Kolmogorov complexity). The more complex a digital file is (and the more information it contains), the larger will be its Kolmogorov complexity and its compressed file size.

Suppose we have two digital string sequences x and y, and the concatenated sequence xy, and a compressor C with C(s) a function returning the number of bytes of the compressed strings.

C(xy) will have almost the same number of bytes as C(x) when x=y. The more y looks like x, the more redundancy there will be, resulting in the size of C(xy) becoming very close to the size of C(x) on its own. One can extract a measure of similarity between two objects based on this phenomenon.

$$NCD(x,y)=C(xy)-\min\{C(x),C(y)\}/\max\{C(x),C(y)\},$$

$$0<=NCD(x,y)<=1.$$

When NCD(x, y)=0, then x and y are similar; if NCD(x,y) =1, then x and y are dissimilar. The size of the concatenated string must be less than the block size (or sliding window size) of the compressor. The compressor will be blind to redundancies that are further apart than the width of the maximum block size. A typical implementation of the gzip compressor has a block size of 32000 bytes whereas bzip2 has a maximum block size of 900000 bytes. The block size imposes a restriction on the size of content that can be analyzed using Normalized Compression Distance, though strategies can be employed to preprocess and simplify the strings to be within the size restriction.

Normalized Compression Distance can be applied to digital objects of any kind, such as images, music, texts, videos or gene sequences.

The examples of the present invention outlined below (image and text) both use the gzip compression algorithm to calculate the Normalized Compression Distance as an approximation of the Information Distance. Alternative compression algorithms could be used such as bzip2 or PPMZ. As an alternative or in addition to using string distance metrics, the content could be assessed using other distance metrics such as semantic distance metrics (Google distance) or colour distance metrics. If the content is represented as objects with attributes (rather than a string), the distance metric could be calculated by assessing the magnitude of change to the objects and attributes before and after the change.

The general form of the Normalized Compression Distance as applied to edited content is shown in FIG. 3. An example of a Normalized Compression Distance calculation as applied to an edited string is shown in FIG. 4.

An example of the Normalized Compression Distance calculation as applied to editing different parts of an image by the same pixel amount is shown in FIG. 5B.

An example of the Normalized Compression Distance calculation as applied to editing images by different pixel amounts is shown in FIG. 5A.

An example of the Normalized Compression Distance calculation as applied to editing a piece of text by an increasing amount is shown in FIG. 5C. Other distance metrics are also provided to demonstrate the superiority of the Normalized Compression Distance for this purpose.

In addition to the mechanism for controlling the size of each edit, the present invention has a voting mechanism that minimizes the possibility of inconsistent edits being applied to the content and maximises the coherent, democratic progression of ideas.

Edits in any iteration are assessed against all other edits for that goal even if the edits are on different parts of the content. This imposes integrity across the whole content. Only the best edit(s) as determined by the voting procedure survive in that iteration. All other edits are discarded. A discarded edit could be retried in a later iteration but has to be reassessed as applied to the content in its new state and has to compete against other proposed edits in that iteration. This process of cumulative selection ensures that any accepted edit has been assessed with respect to the content as a whole and not independently of other parts of the content.

Goal persistence is integral to the invention and helps maintain coherent results. The present invention achieves goal persistence for example by clearly displaying the goal to the users (editors and voters) at every stage. According to the present invention, the editors are editing the content item in order to get closer to the goal and the voters are assessing which version of the content item is closest to the goal. The clear definition and propagation of the goal allows large numbers of collaborators to act coherently without the need for specific communication between the individuals during the collaborative process.

Examples of the present invention will now be described with reference to the accompanying drawings, in which.

Figure 1A:
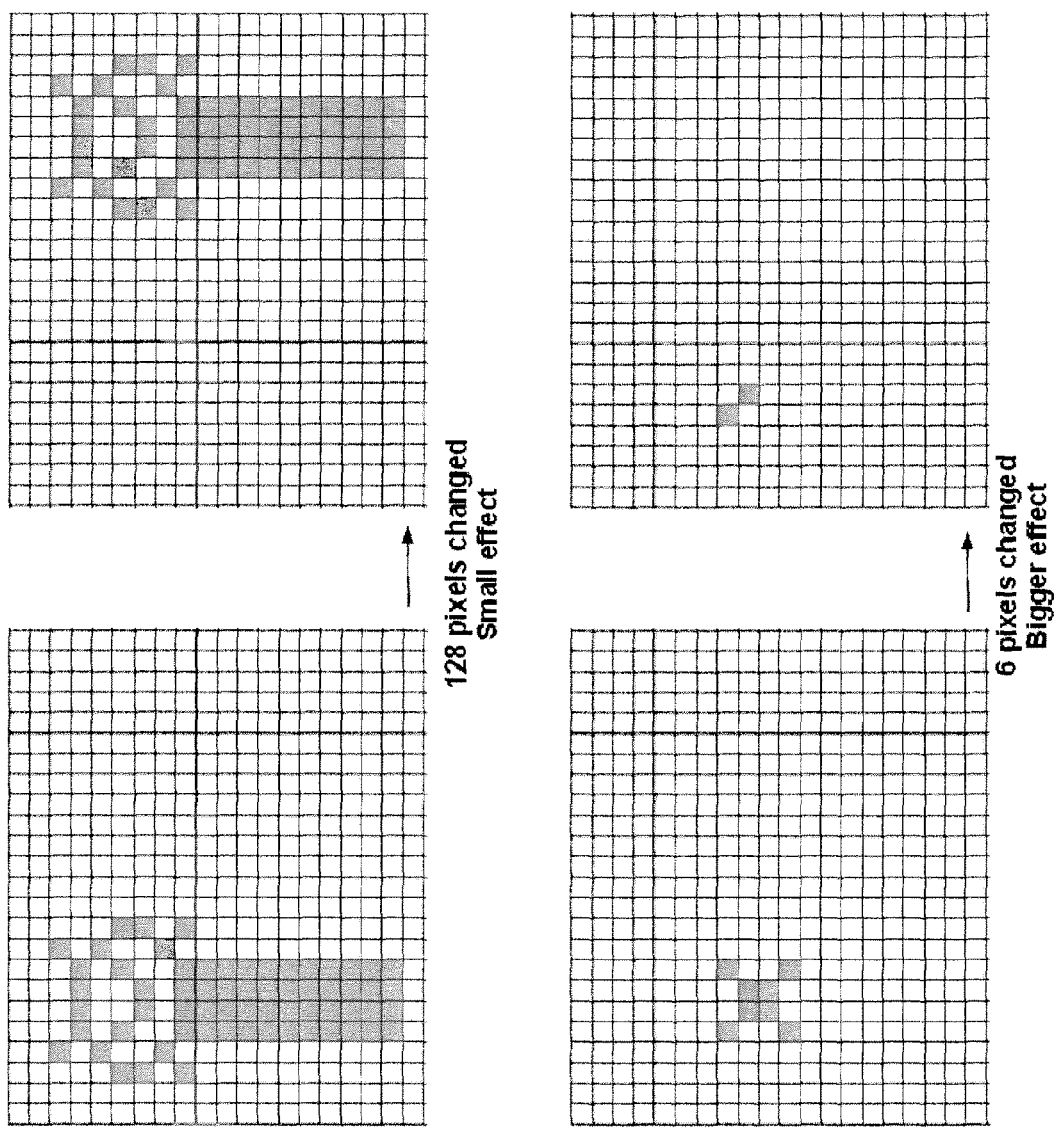
FIG. 1 shows image and text editing examples showing the importance of the amount of change being responsive to the concentration of information in the content.
Figure 1B:
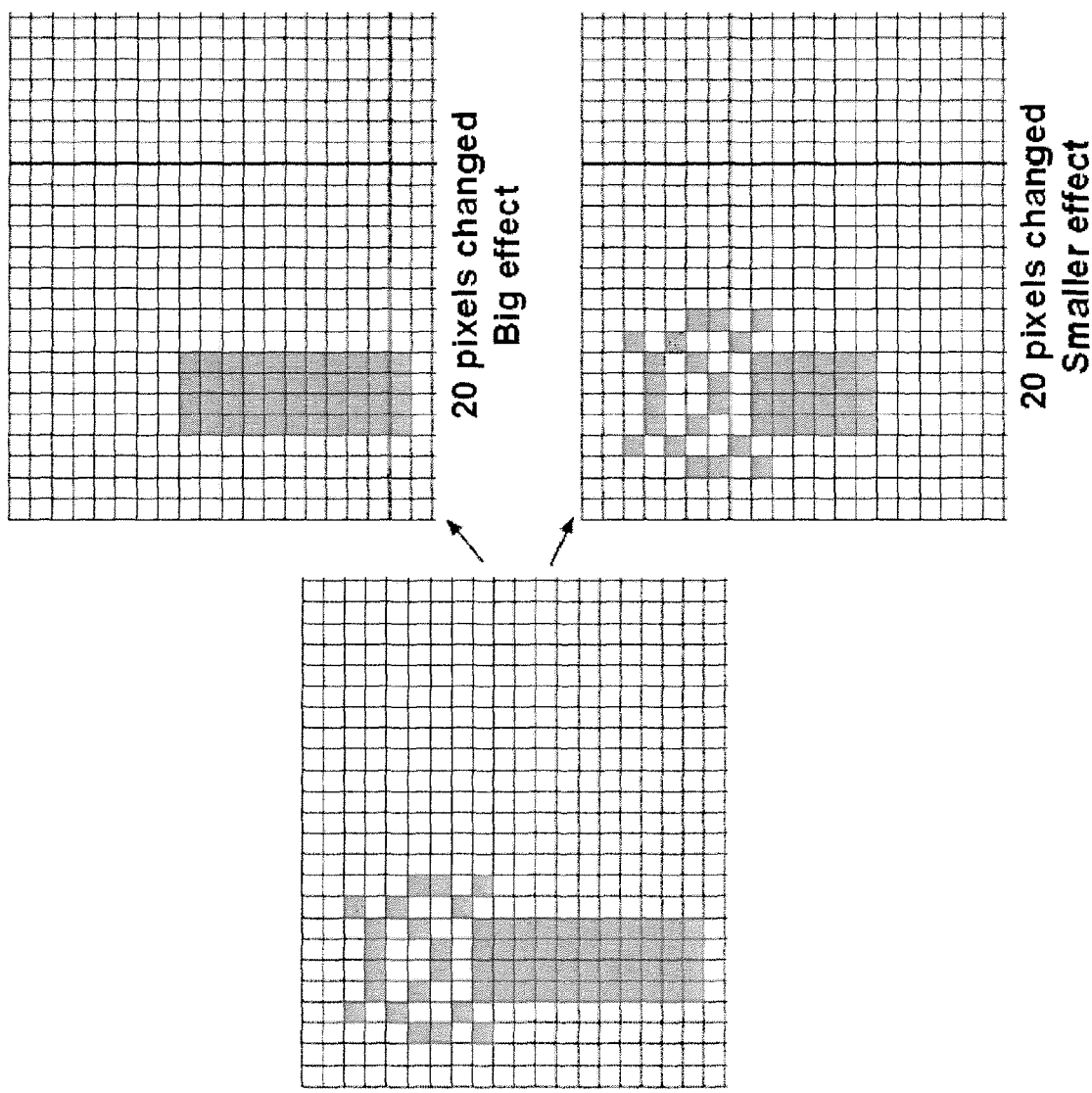
Figure 1C:
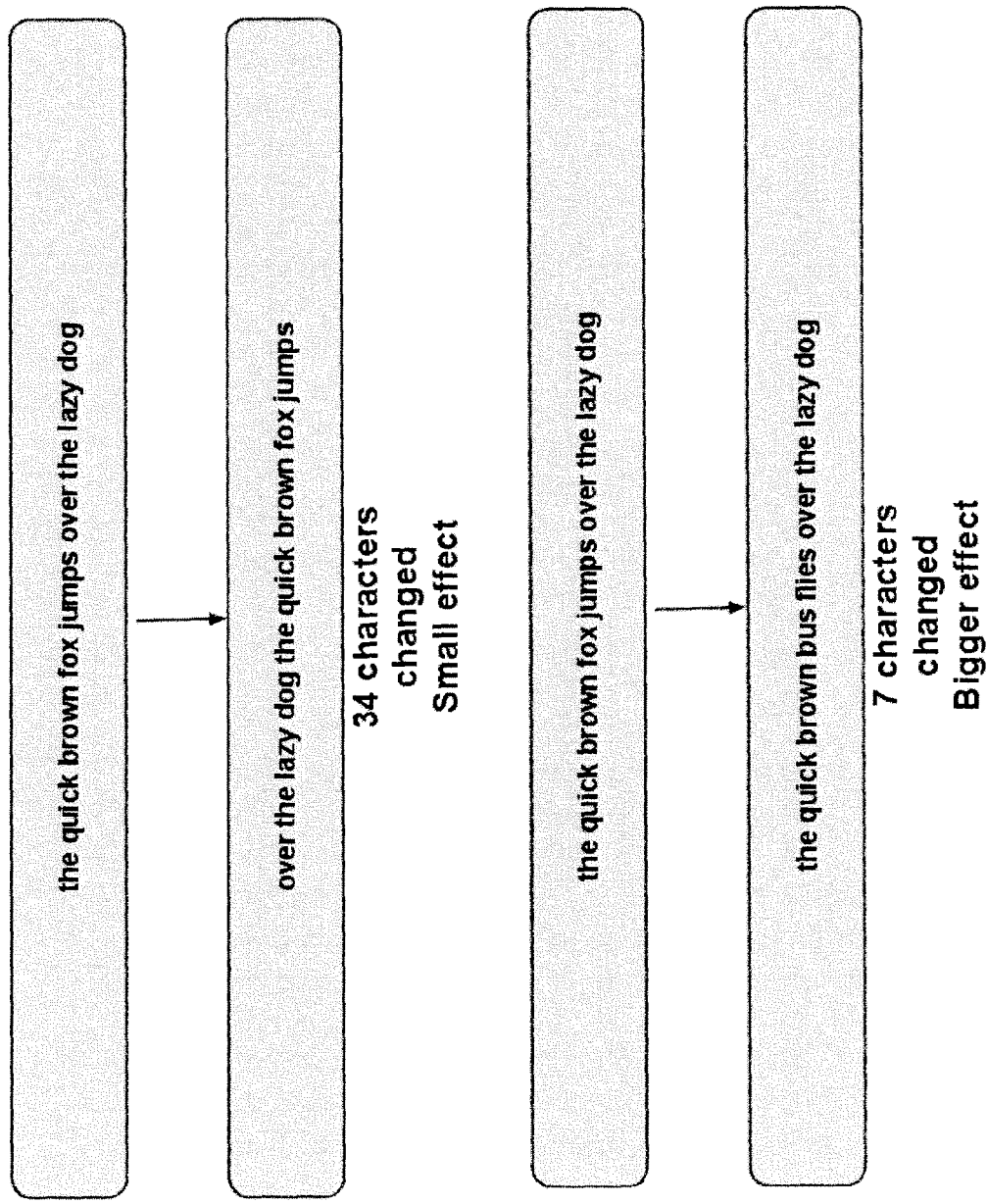
Figure 3:
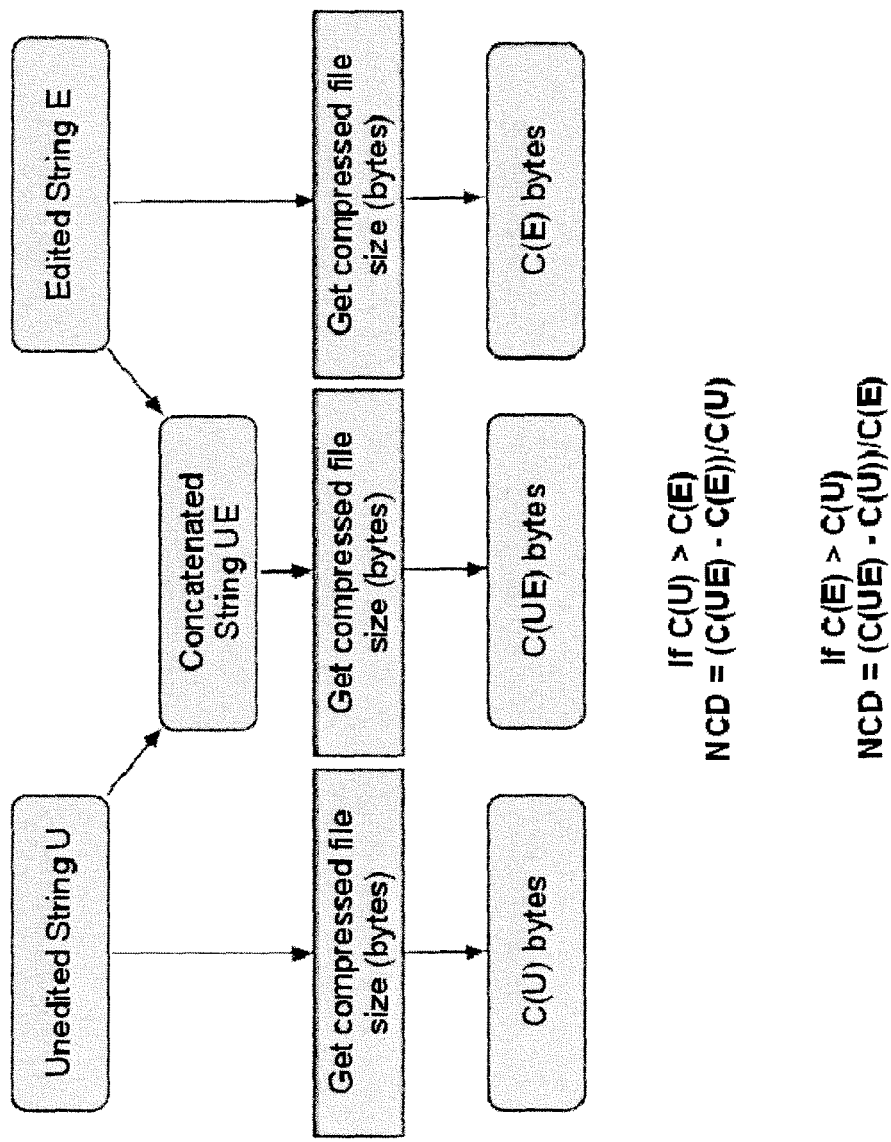
Figure 4:
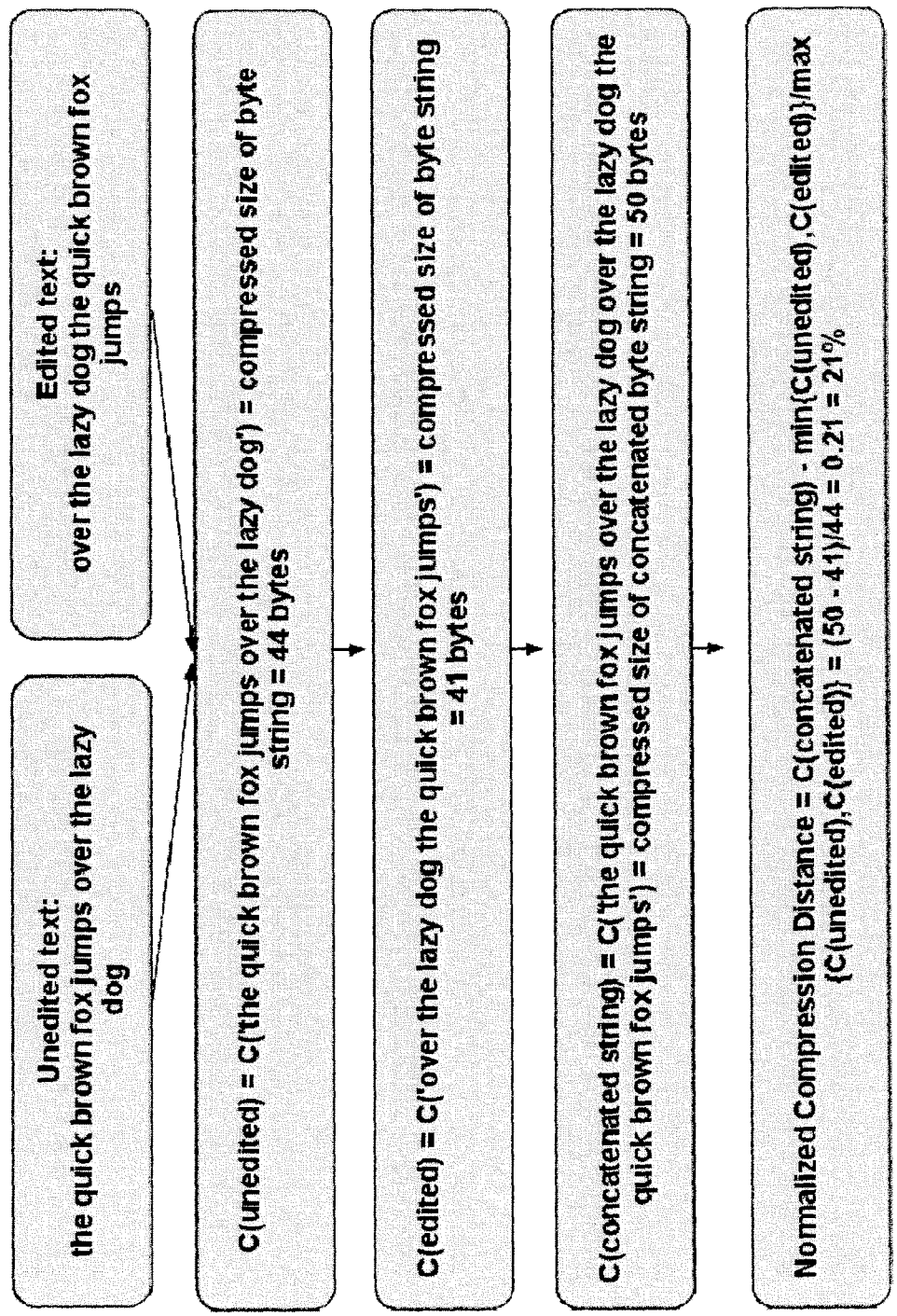
Figure 5A:
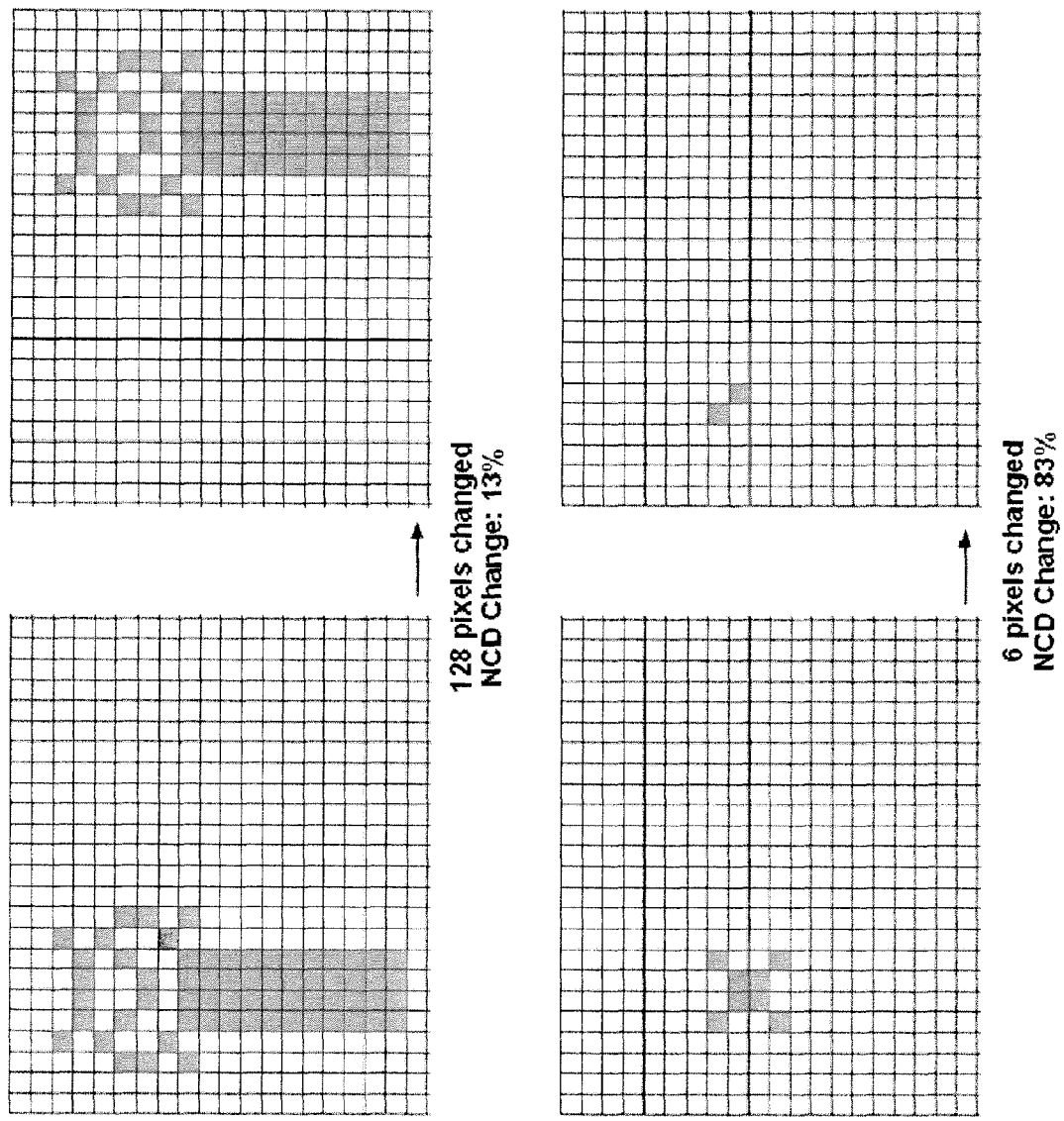
Figure 5B:
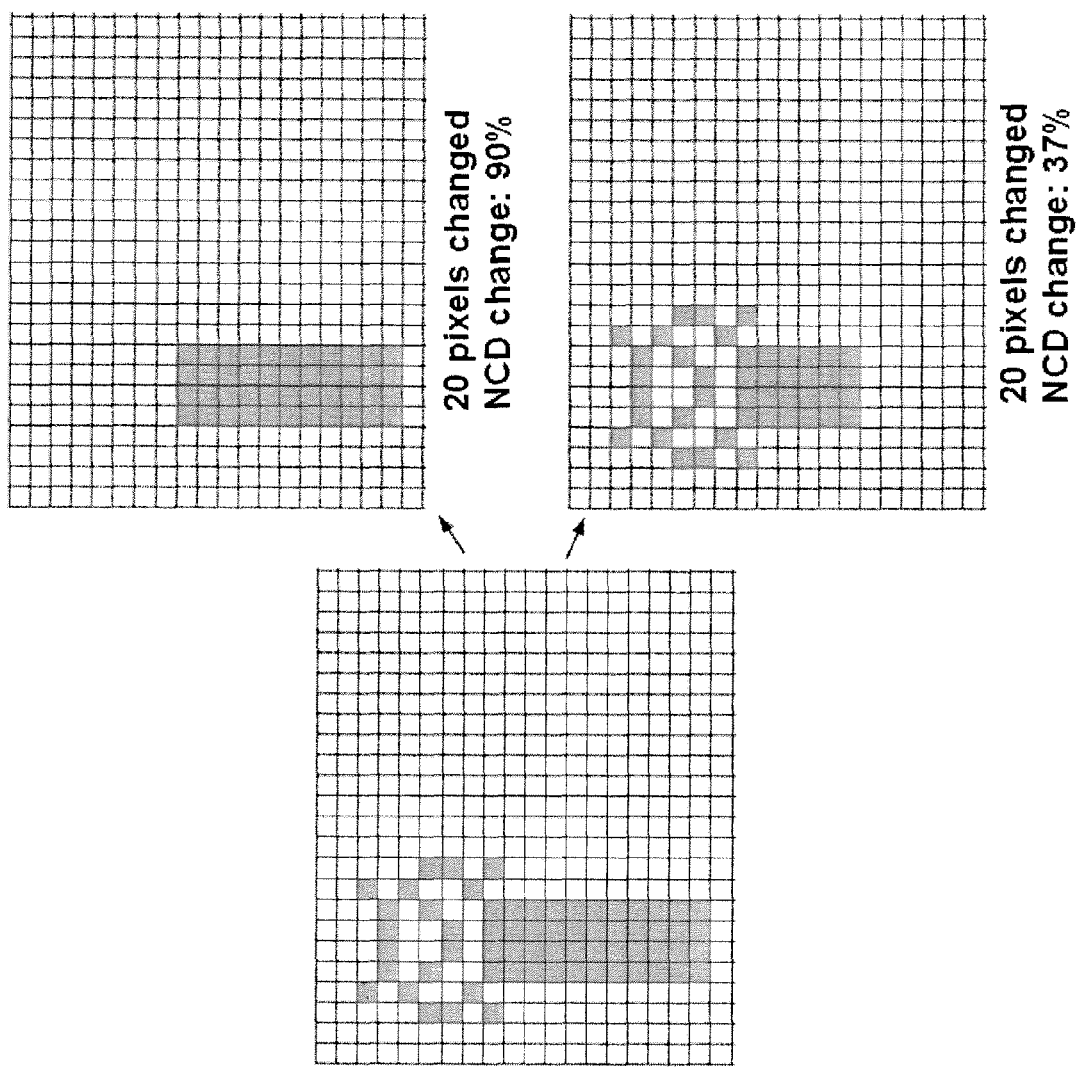
Figure 5C:
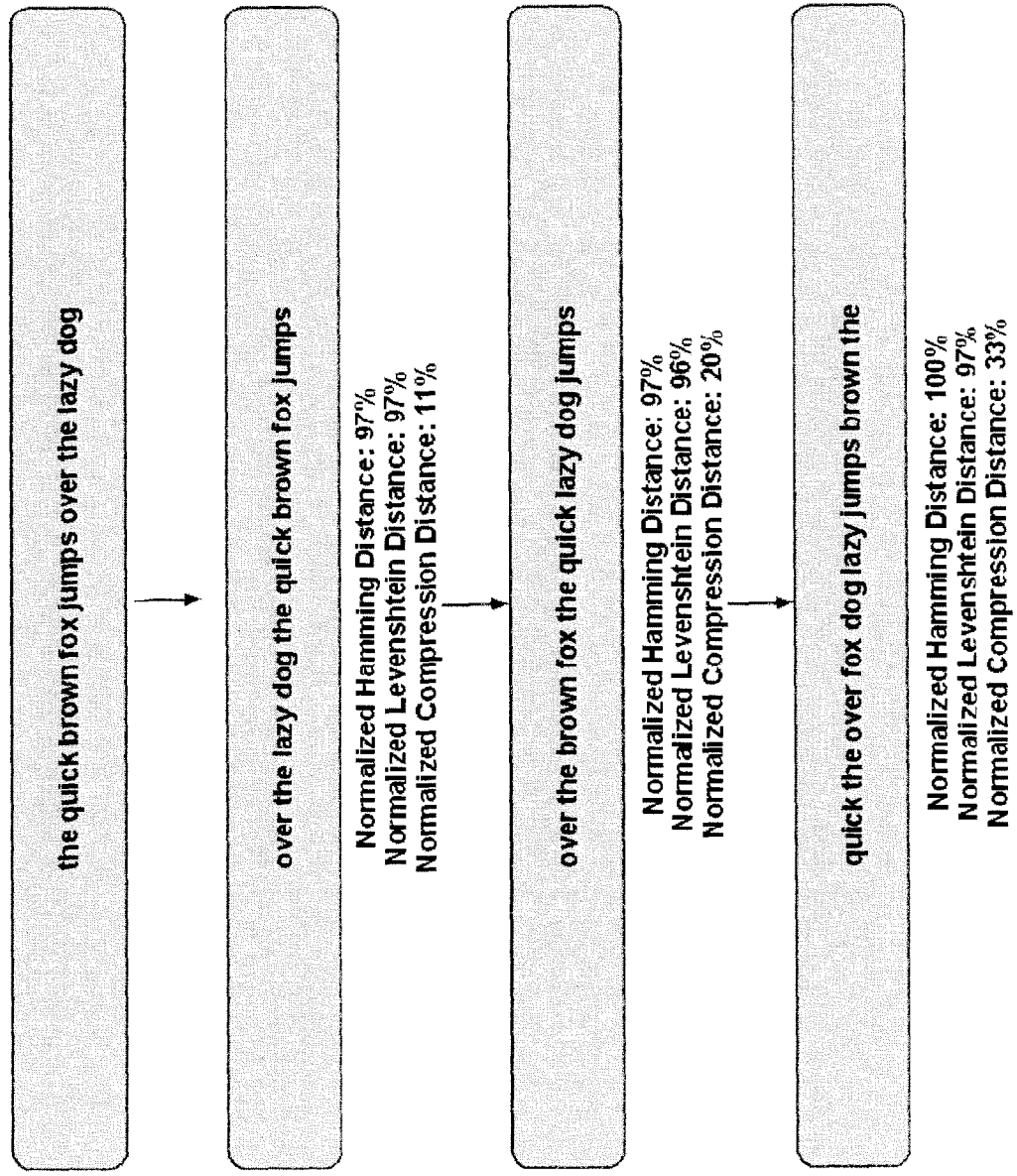
Figure 6:
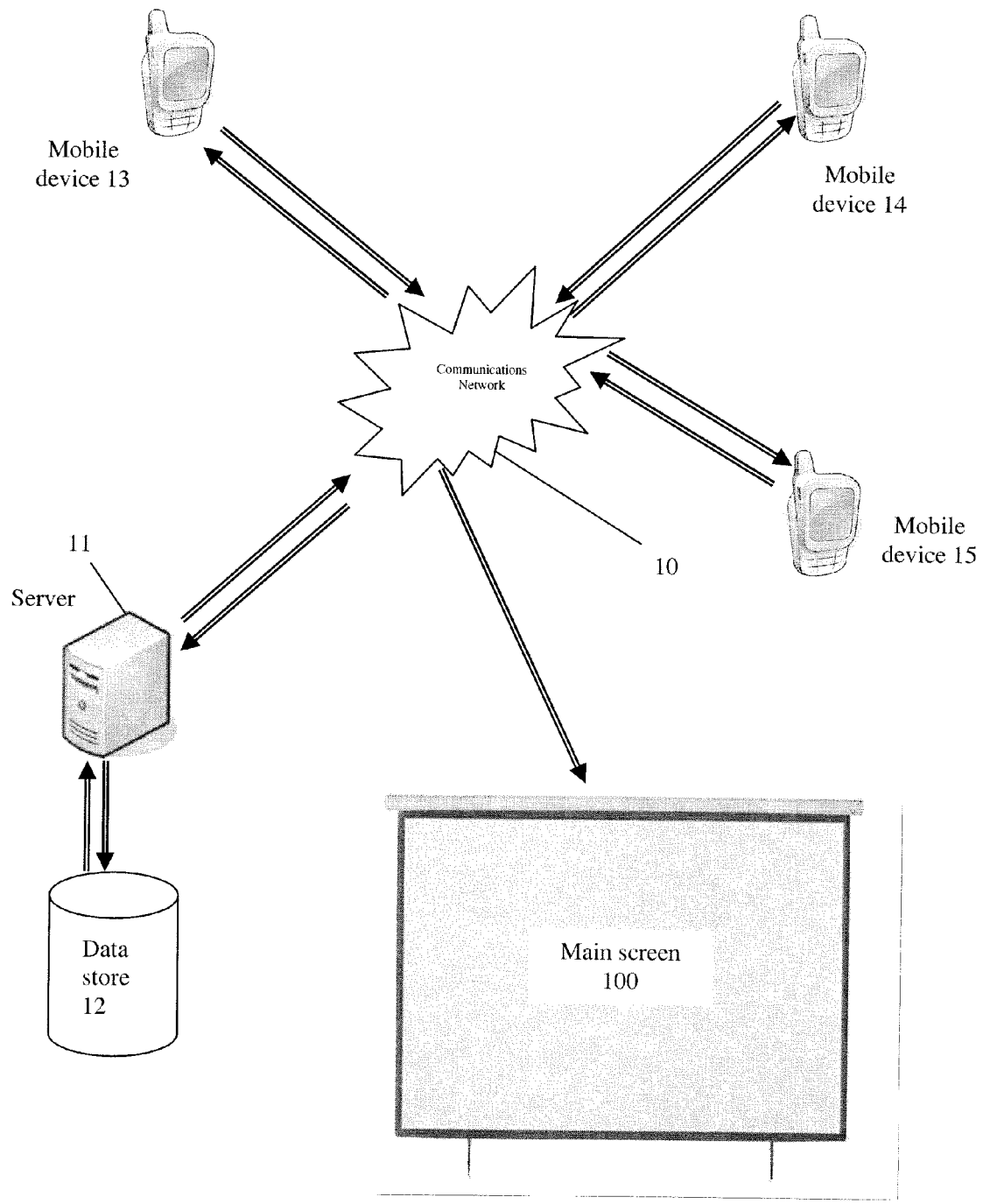
Figure 7:
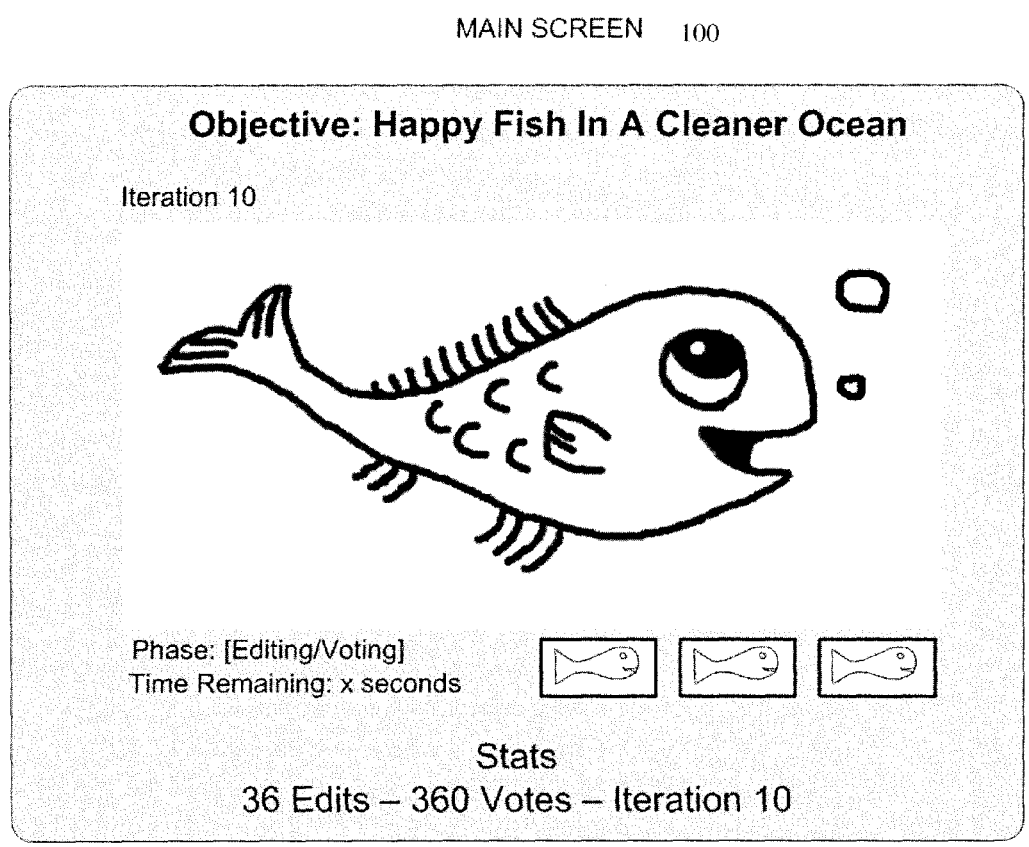
Figure 8:
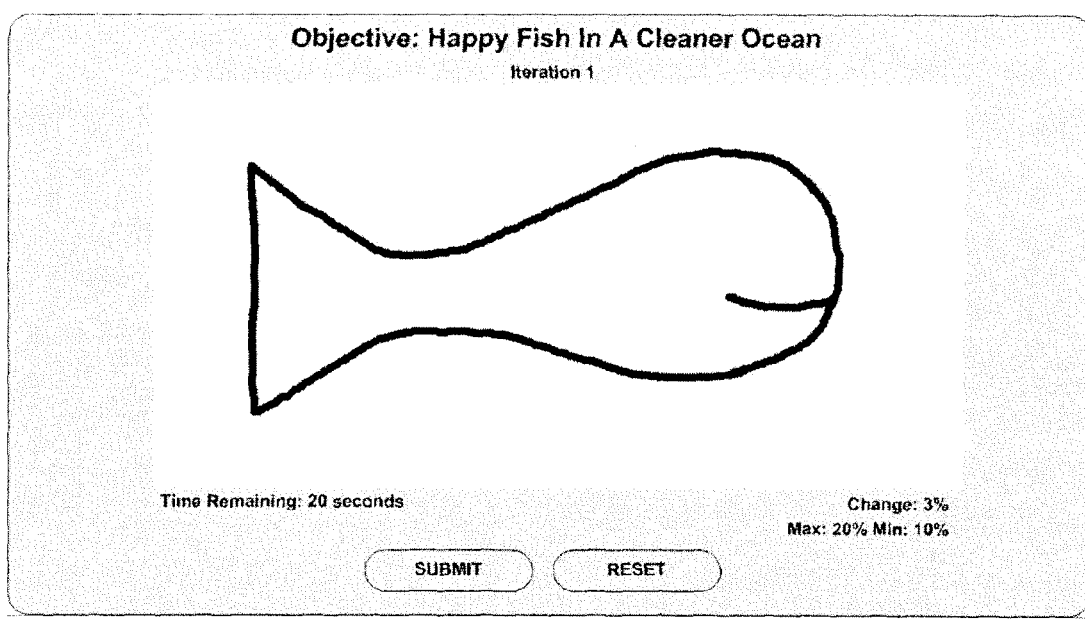
Figure 9:
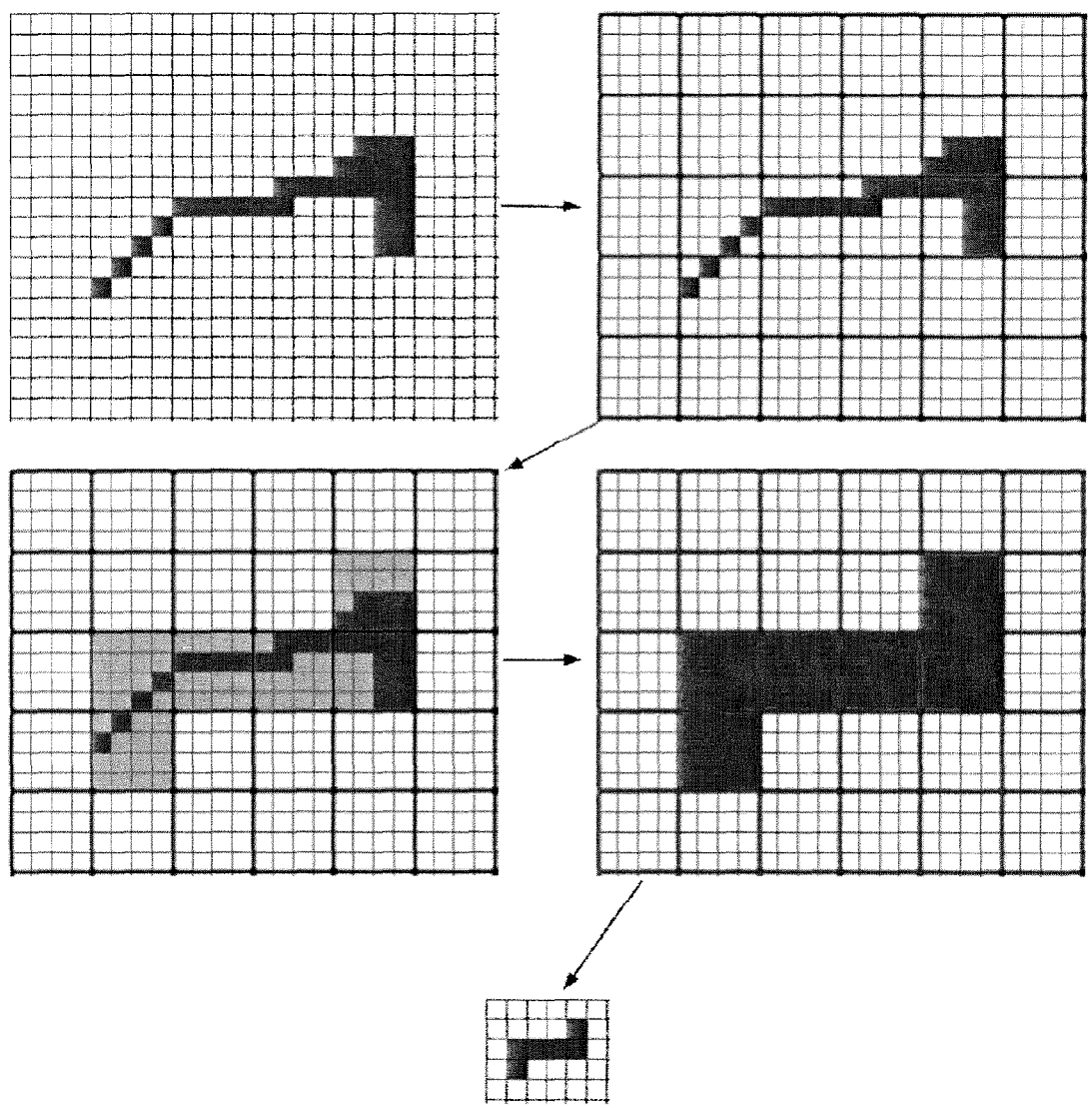
Figure 10:
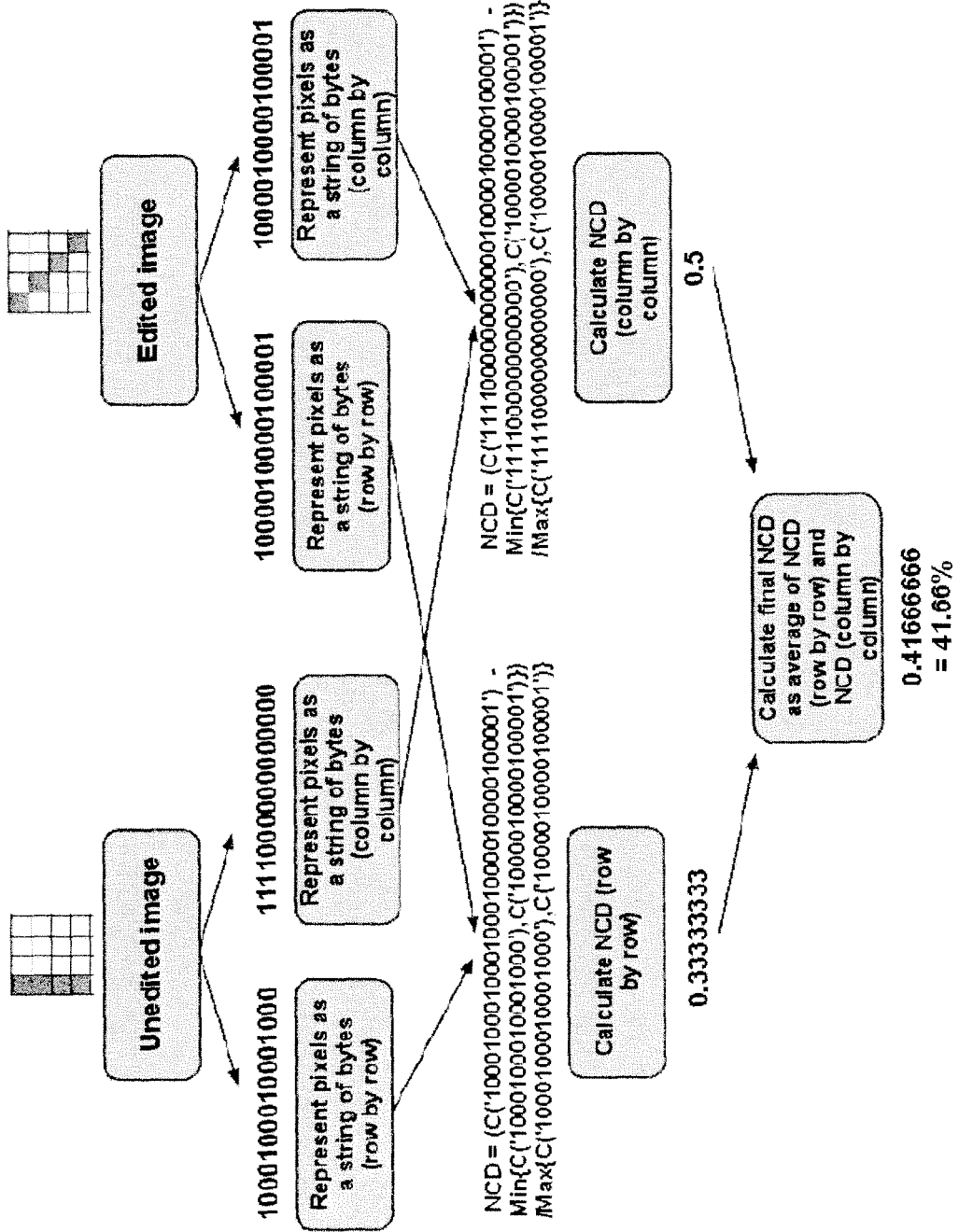
Figure 11:
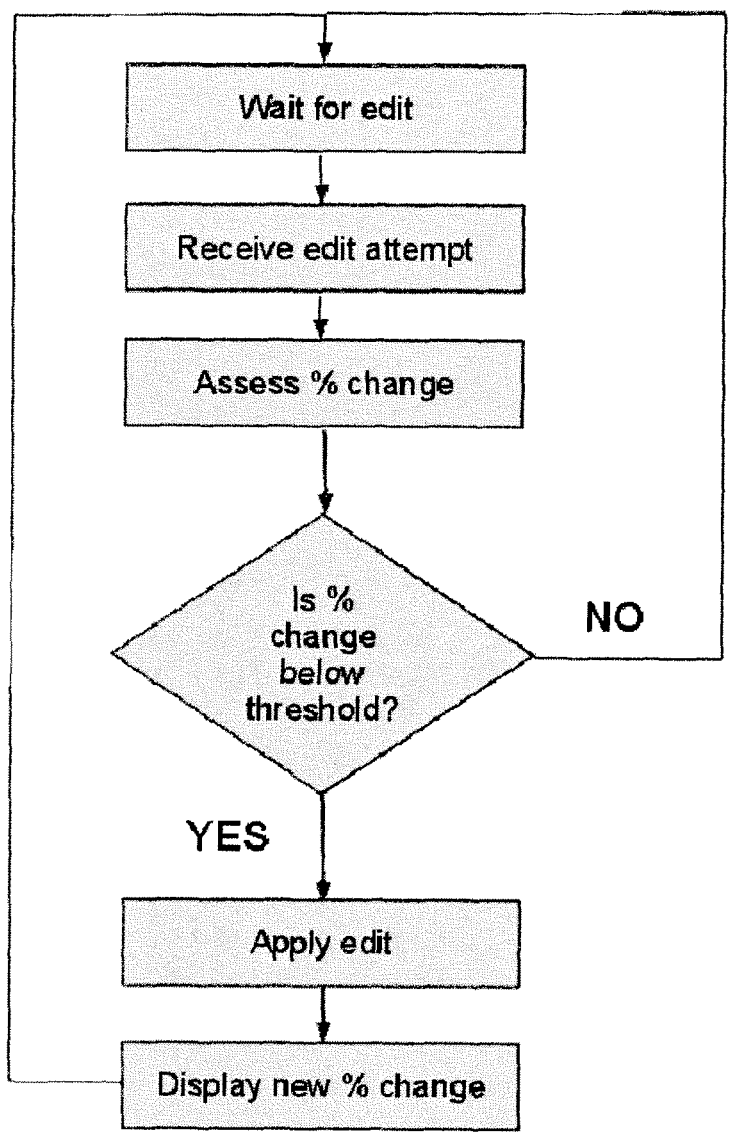
Figure 12:
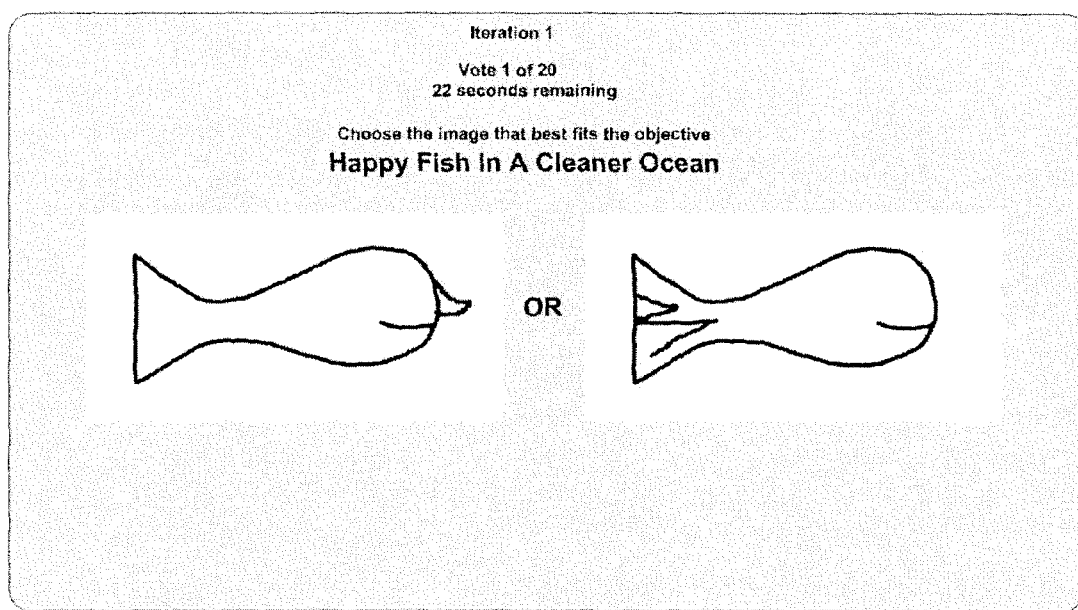
Figure 13:
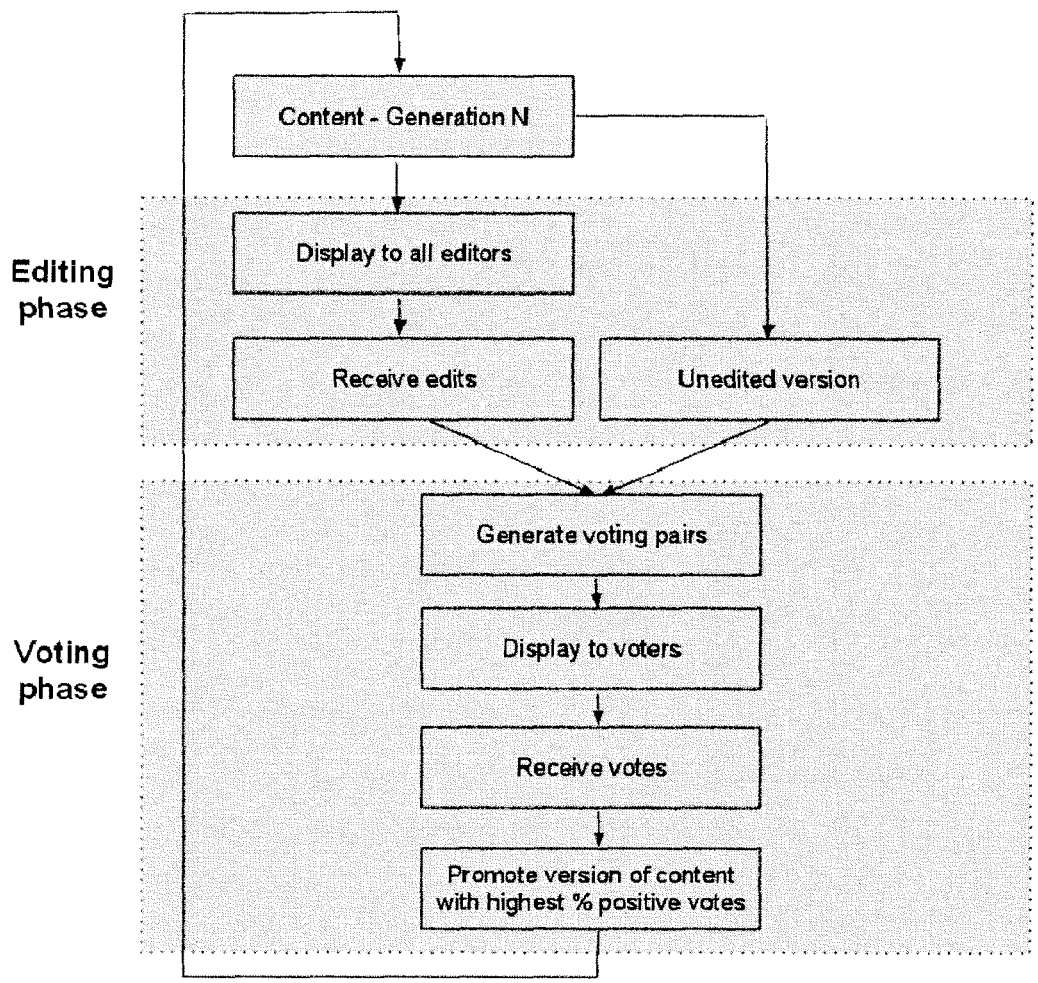
Figure 14:
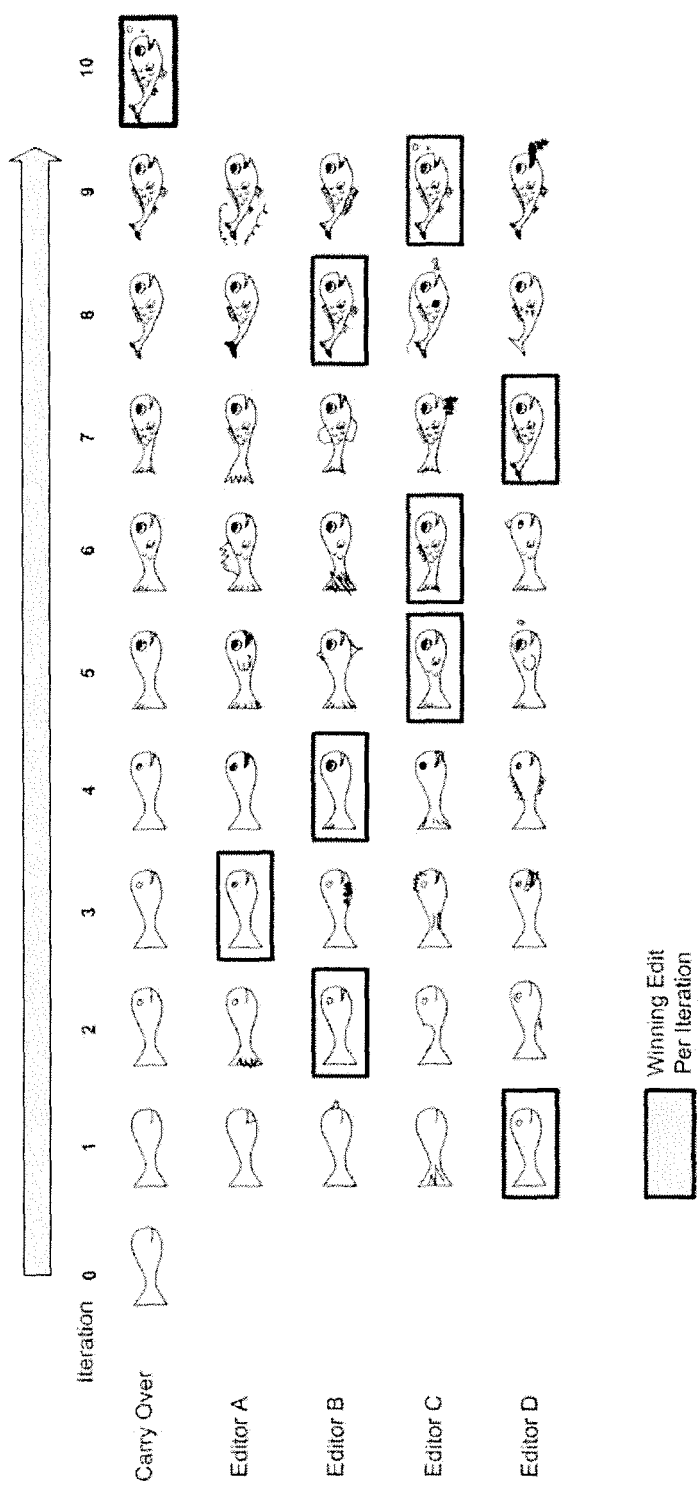
Figure 15B:
Figure 16B:
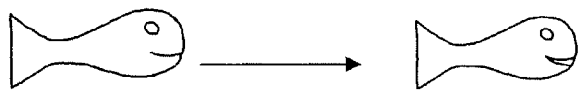
Figure 17:
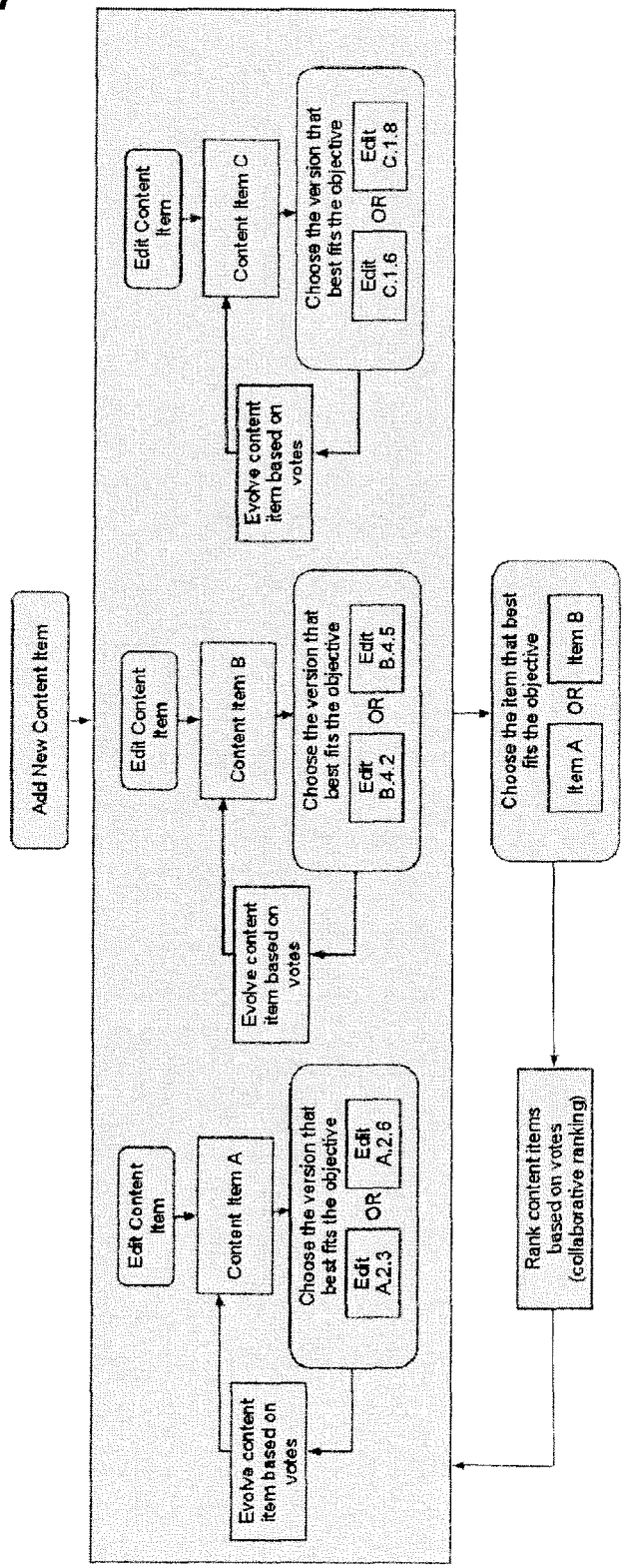
Figure 18:
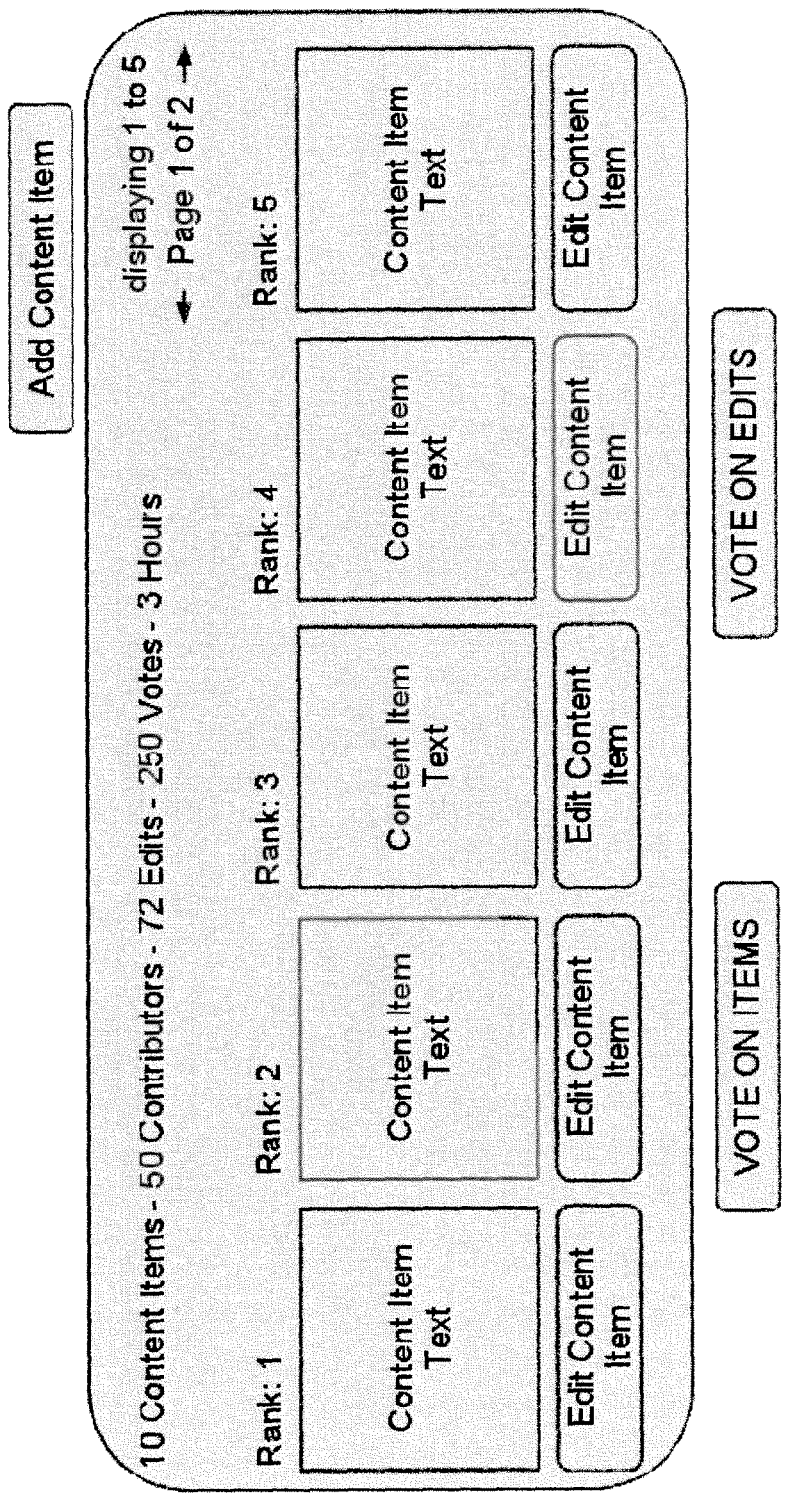
Figure 21:
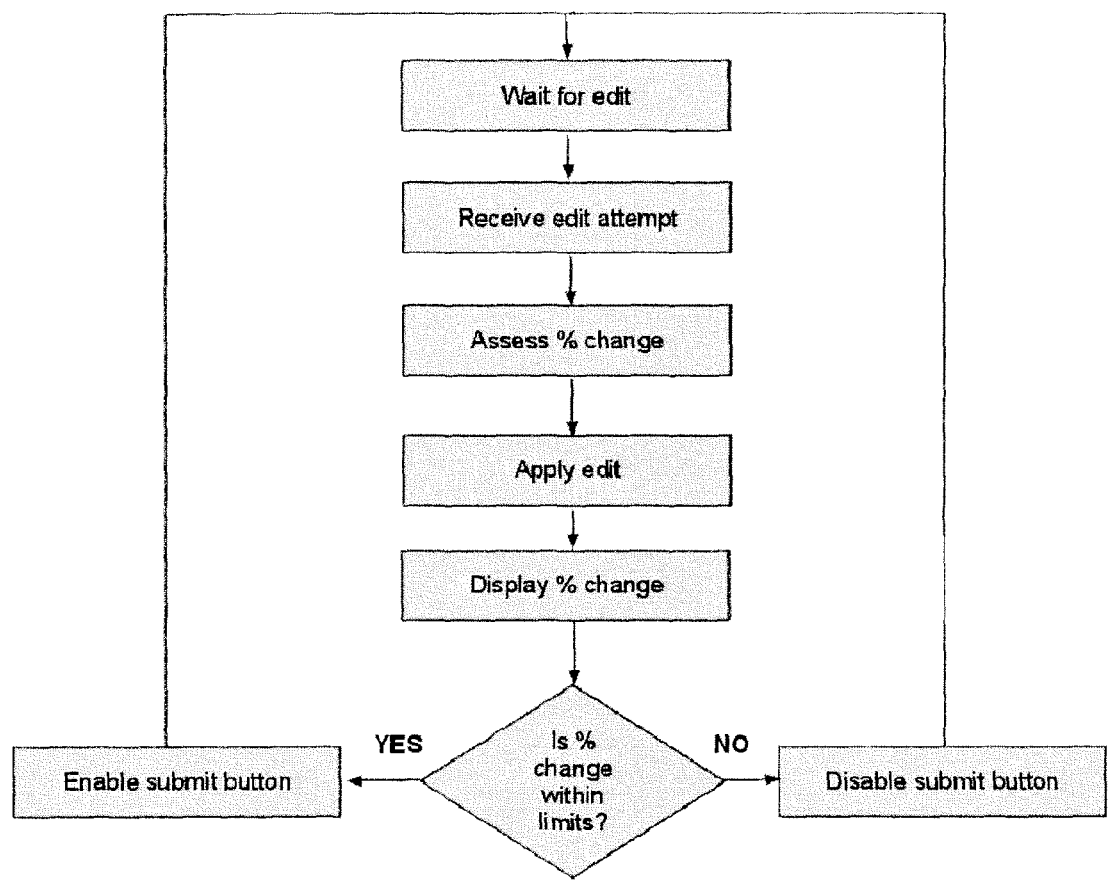
Figure 22:
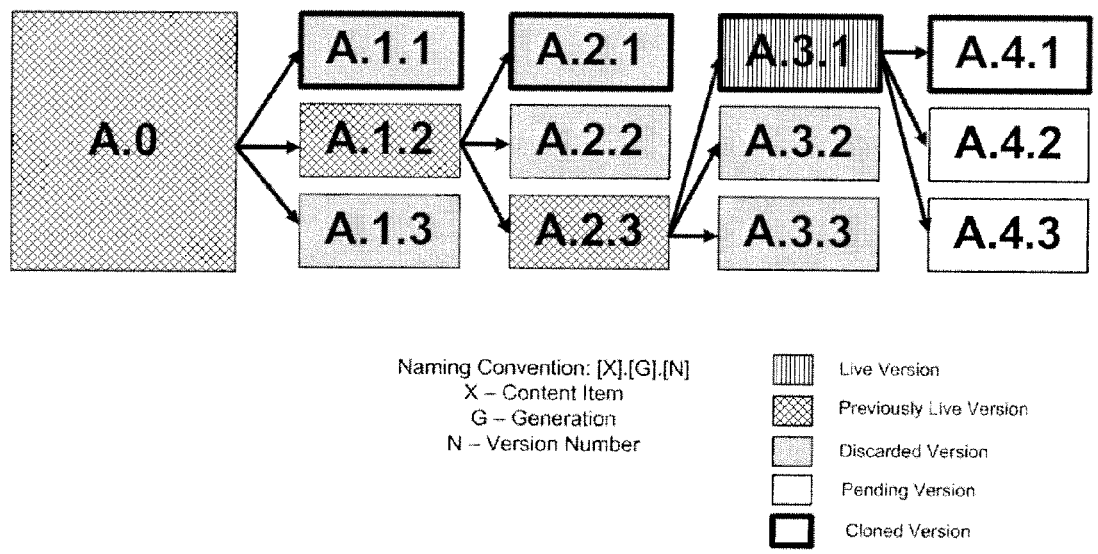
Figure 25:
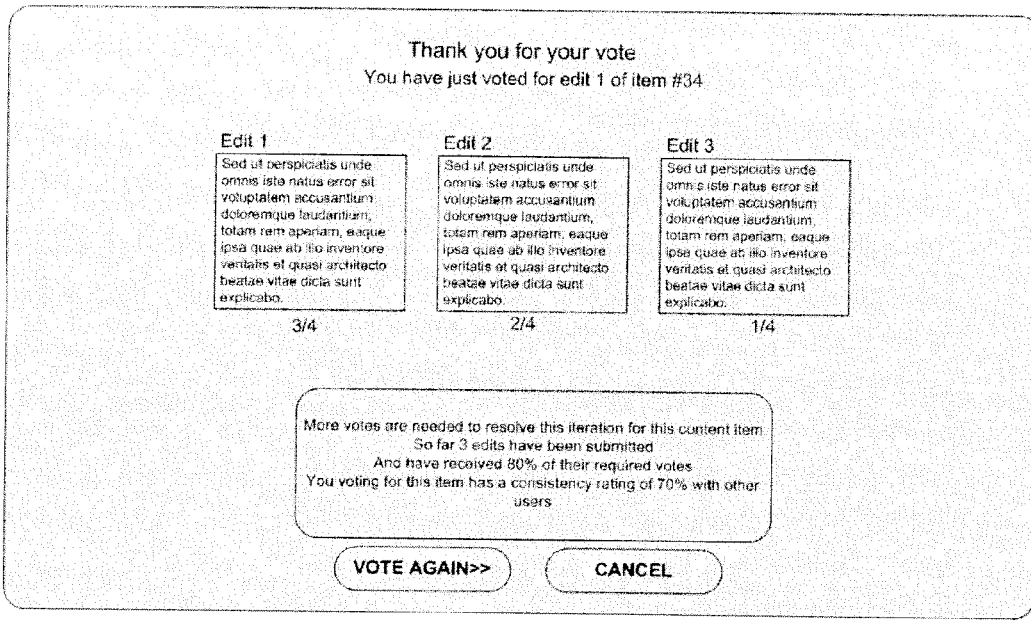
Figure 26:
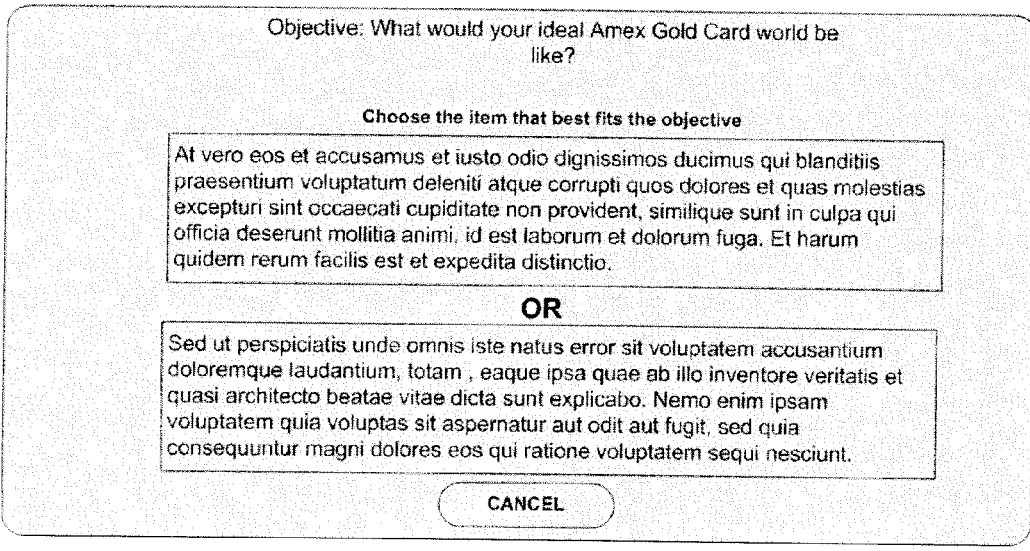
Figure 27:
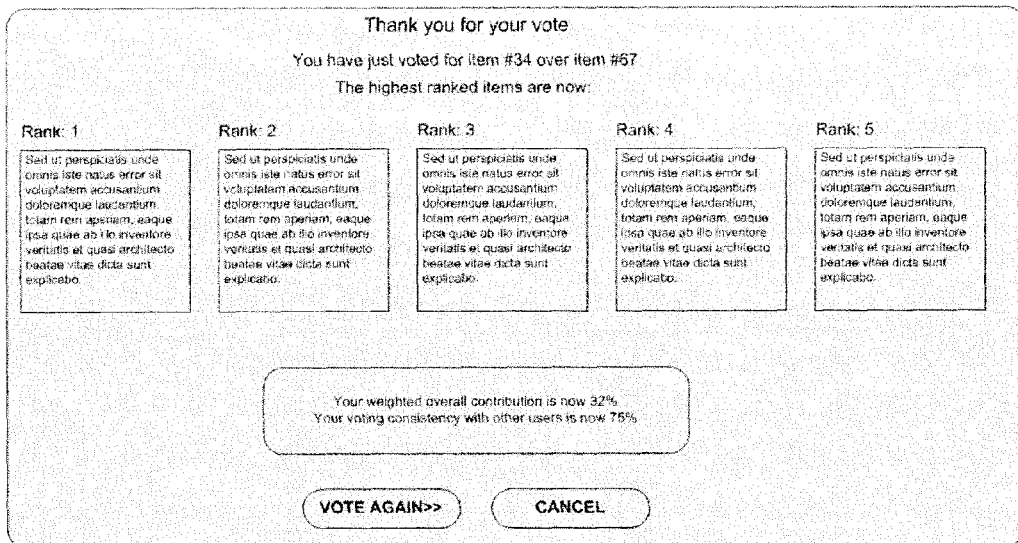
Figure 28:
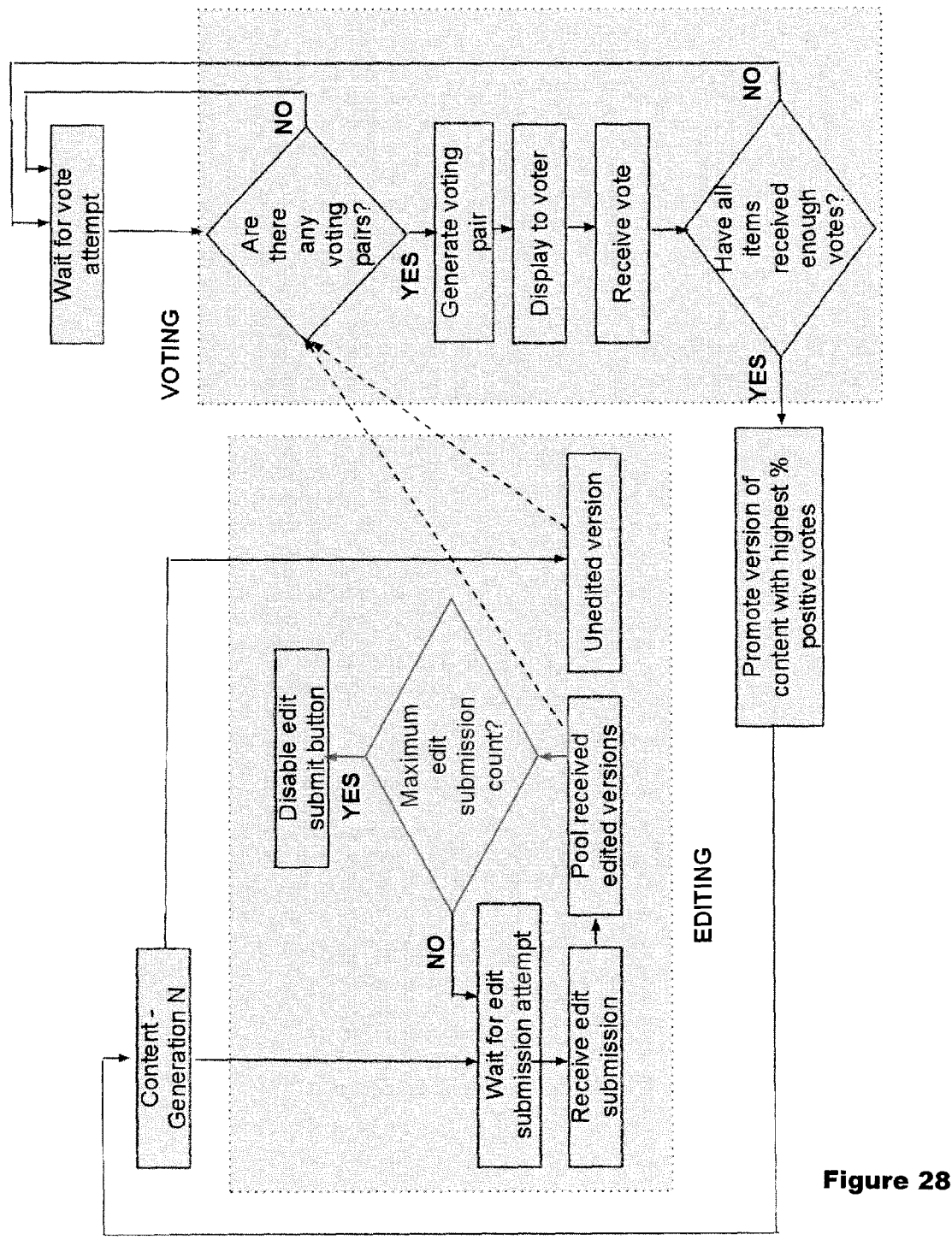

FIG. 3 schematically shows the calculation of the Normalized Compression Distance as applied to edited content;

FIG. 4 schematically shows a Normalized Compression Distance calculation as applied to an edited string;

FIG. 5 shows the editing examples of FIG. 1, wherein the amount of change is calculated as a Normalized Compression Distance;

FIG. 6 is a diagram of a system according to the present invention in a first example;

FIG. 7 shows a graphical display on the main screen in the first example, wherein users edit an image to achieve a common goal;

FIG. 8 shows a graphical display on the editing screen in the first example;

FIG. 9 shows a resampling method for editing an image in accordance with the present invention;

FIG. 10 shows how the Normalized Compression Distance is calculated between two states of an edited image in the first example;

FIG. 11 schematically shows an edit control mechanism according to the present invention;

FIG. 12 shows a graphical display on the voting screen included in the first example;

FIG. 13 shows a flow diagram of the editing and voting process in the first example;

FIG. 14 shows the evolution of the image edited in the first example;

FIG. 15 shows the editing and voting statistics during the first iteration in the first example;

FIG. 16 shows the editing and voting statistics during the second iteration in the first example;

FIG. 17 is a flow chart illustrating the method according to the present invention in a second example, wherein several content items are edited in parallel to achieve a common goal;

FIG. 18 shows a graphical display of the main screen of the mobile interface in the second example;

FIG. 19 shows a graphical display of the add content item screen in the second example;

FIG. 20 shows a graphical display of the edit content item screen in the second example;

FIG. 21 schematically shows an edit control mechanism according to the present invention;

FIG. 22 is a flow chart showing the evolution of one content item in the method according to the present invention;

FIG. 23 shows a graphical display of the edit voting screen in the second example;

FIG. 24 shows a graphical display of the edit voting effect screen in the second example;

FIG. 25 shows another graphical display of the edit voting effect screen in the second example;

FIG. 26 shows a graphical display of the item voting screen in the second example;

FIG. 27 shows a graphical display of the item voting effect screen in the second example; and FIG. 28 shows a flow diagram of the editing and voting process in the second example.

A first exemplary implementation of the goal directed collaborative editing of visual content according to the present invention will be detailed below.

FIG. 6 illustrates a system according to the present invention in which collaborative editing is achieved via a communications network 10 coupled to a server computing device in the form of a server 11 which, in turn, is coupled to a data store 12. The communications network is also connected to several mobile or wearable devices 13, 14, or 15 such as mobile phones, and to a main screen 100, such as a billboard. While FIG. 6 only shows three mobile devices 13, 14, or 15, and only one main screen 100, the system according to the present invention is meant to support a large plurality of mobile devices for users (not shown) to generate collaborative editing. The present invention is also meant to support several main screens for users to witness the collaborative editing process.

A collaborative event has been proposed for Earth Day celebrations taking place in London. In order to bring public awareness to the problem of ocean pollution, the event involves the public in creating an illustration of a 'Happy Fish In A Cleaner Ocean'. The event is to be held in a public place, where at least one main screen 100 is provided for all present participants to witness the editing process. Some participants can take part remotely via their mobile devices.

This example therefore illustrates collaborative editing according to the present invention wherein the edited item is an image. FIG. 6 illustrates the server 11 adapted to receive imaging data for editing. The server 11 uses data store 12 to store or retrieve a plurality of edited images, or images to be edited by a plurality of users using mobile devices 13, 14, or 15. An image editing tool or widget is implemented in any of the mobile devices 13, 14, or 15 available to the public. In this example, the image editing tool handles black and white images of 800×600 pixels. An image voting tool is also implemented in any of the mobile devices 13, 14 or 15 available to the public. The server 11 communicates the goal ('Happy Fish In A Cleaner Ocean') to mobile devices 13, 14, or 15 and to the main screen 100.

In order to illustrate a simple implementation of the method, the number of users, editing/voting time, and maximum iterations is chosen to be relatively small. It will be appreciated however that the number of users, editing/voting time, and maximum iterations may vary widely in practical implementations of the method according to the present invention.

In this example, the participants are four editors equipped with mobile devices (such as 13, 14, or 15) provided with editing tools, and four voters equipped with mobile devices (such as 13, 14, or 15) provided with voting tools. Furthermore, the task is witnessed by twenty spectators via the main screen 100. An editor may also be a voter, or a spectator (the three are not mutually exclusive). For this implementation, the server 11 considers the edited image to be finished after nine iterations (i.e. when it reaches its tenth state). There are some situations where the process is deemed to terminate prematurely, for instance when the responses from the editors or voters are below a certain threshold. Each iteration has a 30 second editing phase, a 30 second voting phase and an evolution phase where the winning edit is promoted to be the 'live version' before continuing on to the next iteration. The maximum allowed change to an image is chosen to be 20% i.e. 0.2 as measured by the distance metric (Normalized Compression Distance) 0 being no change, 1 being completely different. In this example, a minimum change of 10% is also required (0.1 as measured by the distance metric). The starting image (iteration 0) is preset by the event organisers and is a simplistic representation of a fish.

FIG. 7 shows a graphical display on the main screen 100. The goal communicated by the server 11 is clearly displayed at the top of each main screen panel. The iteration number communicated by the server 11 is also displayed in each main screen panel. The server also communicates to the main screen 100 the currently live version of the image in the largest section of the screen. The server also communicates to the main screen 100 the phase of the collaboration (i.e. editing, voting, complete) and the time remaining in that phase. During the editing phases, the server 11 communicates to the main screen 100 the edited submissions as they are submitted so that they scroll underneath the live image. During the voting phases, the server 11 communicates to the main screen 100 the vote preferences as they are cast scrolling underneath the live image. As the image progresses from one iteration to the next, the evolution of the live image is updated. Running totals of edits made and votes cast are calculated by the server 11 and displayed on the main screen.

Images are edited by editors on mobile devices such as 13, 14 or 15 via an interactive editing tool provided with a screen. FIG. 8 shows a graphical display on the editing screen 200 as it appears on the editors' mobile devices 13, 14 or 15. During the editing phase, the latest version of the image is communicated by the server 11 to the editing tools in order to be made available for editing on all 4 editors' mobile devices. Next, the mobile devices 13, 14 or 15 alert the editors that the editing phase has begun. The server 11 also communicates to the main screen 100 to indicate that the editing phase has begun to all the spectators. On the first iteration, the image stored in the data store 12 is the initial image shown in FIG. 8.

The goal ('Happy Fish In A Cleaner Ocean') is displayed clearly at the top of the editing screen 200 on a mobile device 13, 14, or 15. During the task, editors attempt to make edits which fit the goal. The image to be edited is displayed on an editable portion of the screen 200. A SUBMIT button and a RESET button are located underneath the editable portion of the screen 200. A colour picker (not shown) is also located underneath the editable portion of the screen 200. In its simplest form, the colour setting of the colour picker can either be 'white' or 'black'. When the user presses a pointing device (not shown) on one of the colours on the colour picker, that colour becomes the selected colour and is highlighted in the colour picker. The user draws in the selected colour by pressing the pointing device on the editable portion of the screen.

The system calculates the % change of the edit after each pixel is rendered on the screen. The % change is calculated by comparing the unedited version of the image with the latest edited version of the image.

The system uses the gzip compression algorithm to calculate the Normalized Compression Distance between the two states of the image. The standard gzip compression algorithm can only 'see' redundancy within a 32K sliding window (the block size of the compressor), but, assuming each pixel is coded as a single byte, the 800×600 image would be a total 480K. This is too big for the gzip 32K sliding window.

So, a preliminary stage of the calculation is to resample the images (unedited and edited versions) into lower resolution images to get each image size within the block size of the compressor. Here we resample the images to 200 pixel by 150 pixel images. This is done using a simple resampling method, resolving each 4×4 block of pixels into a single pixel (see FIG. 9). If any one of the 16 pixels in the original image is black, the resampled pixel is black. The resulting image can be coded as a 30K string (if we use 1 byte per pixel) which is inside the limits of the gzip sliding window.

Two strings representing the unedited state of the image are constructed. The strings use a zero ('0') to represent a black pixel and a one ('1') to represent a white pixel. One string codes the image by considering each pixel from the top left going row by row. The other string codes the image by considering each pixel from the top left going column by column (see FIG. 10).

S(unedited:row)
S(unedited:column)

Two strings representing the edited state of the image are constructed in the same way.

S(edited:row)
S(edited:column)

The Normalized Compression Distance for the strings constructed row-wise is calculated:

$$NCD(S(\text{unedited:row})S(\text{edited:row}))=C(S(\text{unedited:row})S(\text{edited:row}))-\min\{C(S(\text{unedited:row})),C(S(\text{edited:row}))\}/\max\{C(S(\text{unedited:row})),C(S(\text{edited:row}))\}$$

The Normalized Compression Distance for the strings constructed column-wise is calculated:

$$NCD(S(\text{unedited:column})S(\text{edited:column}))=C(S(\text{unedited:row})S(\text{edited:column}))-\min\{C(S(\text{unedited:column})),C(S(\text{edited:column}))\}/\max\{C(S(\text{unedited:column})),C(S(\text{edited:column}))\}$$

In this example, the final Normalized Compression Distance is calculated by averaging these two answers:

$$NCD(S(\text{unedited})S(\text{edited}))=(NCD(S(\text{unedited:row})S(\text{edited:row}))+NCD(S(\text{unedited:column})S(\text{edited:column})))/2$$

The Normalized Compression Distance will give different results depending on whether the image string is constructed row-by-row or column-by-column. By calculating both and then averaging we can normalize this inconsistency and not bias some transformations over others.

The Normalized Compression Distance as calculated in the above formula returns a number between 0 and 1. In order to display the % change on the screen rounded to two decimal places, we need to format as follows:

$$\text{\% change}=\text{Round}(NCD(S(\text{unedited})S(\text{edited}))*100,2)$$

The percentage change is recalculated and displayed at all times on the editing screen 200. When the change to the image has reached the limit of 20%, the editor is prevented from changing any more. If a pixel is changed back to its original colour, the percentage change reduces accordingly. Thus, it is possible to continue even when the limit is reached by reverting some pixels back to their original state.

FIG. 11 schematically shows the edit control mechanism according to the present invention. What remains of the 30 second time limit is communicated by the server 11 to the mobile device 13, 14 or 15 and displayed in the bottom left corner of the editing screen 200. When the editors are happy with the changes, they can press the SUBMIT button on editing screen 200. By pressing the RESET button on the editing screen 200, all edits are discarded by the editing tool and the image is returned to its original state before any editing in this iteration and the percentage change returns to zero. New edits can then be applied. If the 30 second time limit is reached before the SUBMIT button has been pressed and more than 10% has been changed, the edit will be automatically submitted to the server 11. In this example, each editor is allowed one edit per iteration. Different implementations however may allow for several edits per user per iteration. If there are no edits submitted (manually or automatically) within the 30 second time limit, the process is terminated by the server 11. During the editing phase, once edited images are submitted to the server 11, they are the communicated to the main screen 100 to be displayed under the live image shown in FIG. 8 as scrolling images. The main screen 100 also displays how many seconds of the editing phase remains. Once the editing phase is over, the editors will see the same display as the main screen until the next editing phase begins.

FIG. 12 shows a graphical display on the voting screen 300 of a voting tool implemented in their mobile devices 13, 14, or 15. Each voter is alerted by the server 11 on their mobile devices 13, 14, or 15 and through the phase information section of the main screen 100 when all edits are stored in the data store 12 and the voting stage has begun. The preferred implementation of the method presents the voter with pairs of images submitted by the server 11 to the voting tool on the mobile devices 13, 14, or 15, so that the voter may choose one of the two images. In this example, each voter is presented with all possible pairs of the edited images from the edit round that has just completed. The server 11 also includes in the pairs the unedited version of the image, to give the opportunity for none of the edits to win and for the image to go through the iteration unchanged. If all 4 editors have successfully made an edit, each voter will have the opportunity to vote on 10 pairings. This is the total number of ways to pair the 5 versions (4 edited versions and the unchanged image). All possible vote pairs are sent by the server 11 in random order to each of the voters. Each voter can potentially vote on all 10 possible pairs. In this example, a vote is presented to the voter as a pair of images on the voting screen 300, with the instruction, 'Choose the image that best fits the goal: Happy Fish In A Cleaner Ocean'. The amount of time left of the overall 30 second voting time limit is also communicated by the server 11 to the mobile devices 13, 14, or 15 to be displayed on the voting screen 300. An indication of the current vote number is also communicated by the server 11 to the mobile devices 13, 14, or 15 to be displayed on the voting screen 300 (e.g. 1 of 10). When the voter selects one of the images with a pointing tool (not shown), the voting screen 300 immediately displays the next voting choice, indicating that this is now the next vote (e.g. 2 of 10). In this example, the voting phase must be completed in 30 seconds or less, however, in the event that there are under five votes from a minimum of two voters, the process is terminated.

During the voting phase, the server 11 communicates with the main screen 100 for the phase information section to display that the voting phase is underway and to show the remaining voting phase time. As the votes are cast by the voters, the voting tools on the mobile devices 13, 14, and 15 transmit the votes to the server 11 to be stored in the data store 12 and to be transmitted to the main screen 100 where they are displayed scrolling underneath the live image. Once the voting phase is over, the voters will see the same display as the main screen until the next voting phase begins.

A flow diagram of the editing and voting process is shown in FIG. 13.

FIG. 14 shows the evolution of the image edited in the present example during the 9 iterations. The winning edit is indicated for each iteration and the final resulting image is shown in the 10$^{th}$ image state.

Examples of editing and voting results and processing of results for the first two iterations of the method in this example are tabulated in FIG. 15 and in FIG. 16. When the voting period is over, the server 11 determines the winning edit by calculating the highest percentage success rate (e.g. number of vote pairs won divided by total vote pairs taken part in). If two images are tied, the server 11 chooses the winning edit randomly. The winning edit becomes the live version of the image. This image supersedes the live image presented in the live image panel on the main screen 100. Summary statistics of the editing and voting process are calculated by the server 11 and displayed on the main screen 100, indicating for example that the next iteration has been reached, how many edits have been made, how many votes have been made, and the running balance of the percentage winning contributions per editor.

In this example, the starting image is considered to be unowned (i.e. 100% owned by 'Unknown'). If an edit from an editor wins a round, that editor is credited with ownership in accordance with the size of the edit (e.g. 20%) and any existing ownership percentages are reduced by the size of the edit (e.g. 20%), thus keeping the total ownership at 100%.

According to the present invention, by applying incremental edits in a series of timed rounds, the users contribute to the collaborative development in real-time. As the content evolves towards the goal, the participants have a live experience that they are driving the evolution with their contributions. The spectators witness the development live with constant visual feedback about how the evolution is progressing. A person skilled in the art would appreciate that this implementation could be scaled up for use with many thousands of participants without compromising the coherence or the live experience.

In another, more complex example according to the present invention, it is possible to evolve several different content items in parallel and to rank the different content items by means of a second independent voting layer as illustrated in FIG. 17. In the previous example, there was one starting point for the goal submitted by the event organisers. In this second example, a number of content items can be submitted by users as independent starting points, each one capable of being developed by a method similar to the first example.

In this example, there are ten participants equipped with mobile devices (such as 13, 14, or 15) provided with both editing and voting tools. All participants are enabled to submit new content items, vote on content items, edit content items and vote on edits of content items. In other implementations (similar to the first example), it might be desirable to have one group of users exclusively contributing content items, one group of users exclusively making edits, one group of users exclusively voting on content items and another group of users exclusively voting on content edits. Or the system could be divided into teams where closed groups of users contribute a single content item, edit that content item and vote on edits for that content item. A separate group could then vote between different teams' content items. The task is witnessed by twenty spectators via the main screen 100. A significant difference from the first example is that there are no timed iterations. Edits and votes can be attempted at any time, with the evolution triggered when the voting reaches a threshold (see below). For this example, the goal is 'What would your ideal Amex Gold Card world be like?'. The content submissions are text of between 200 and 500 characters. Edits to content items cannot exceed 20% and must have a change greater than 0% (as measured by the distance metric). For this implementation, the server 11 considers the collaborative process to be finished after 4 hours of first accepting submissions.

The server 11 communicates to all participants that the collaborative task has begun. The main screen 100 indicates the system is ready to receive the first submission.

All mobile devices have an interface 400 as illustrated in FIG. 18. The interface 400 displays the goal ('What would your ideal Amex Gold Card world be like?') clearly at the top of the screen. Below the goal is a paged section of the screen displaying the individual content items in order of their ranking. This section is initially blank as the system awaits the first submission. At the top of the screen is a button labelled ('Add Content Item'). Underneath each content item is a button labelled ('Edit Content Item'). At the bottom of the screen is a button labelled ('Vote on Items') and a button labelled ('Vote on Edits'). The functions of the buttons on the interface 400 are described below.

Figure 2:
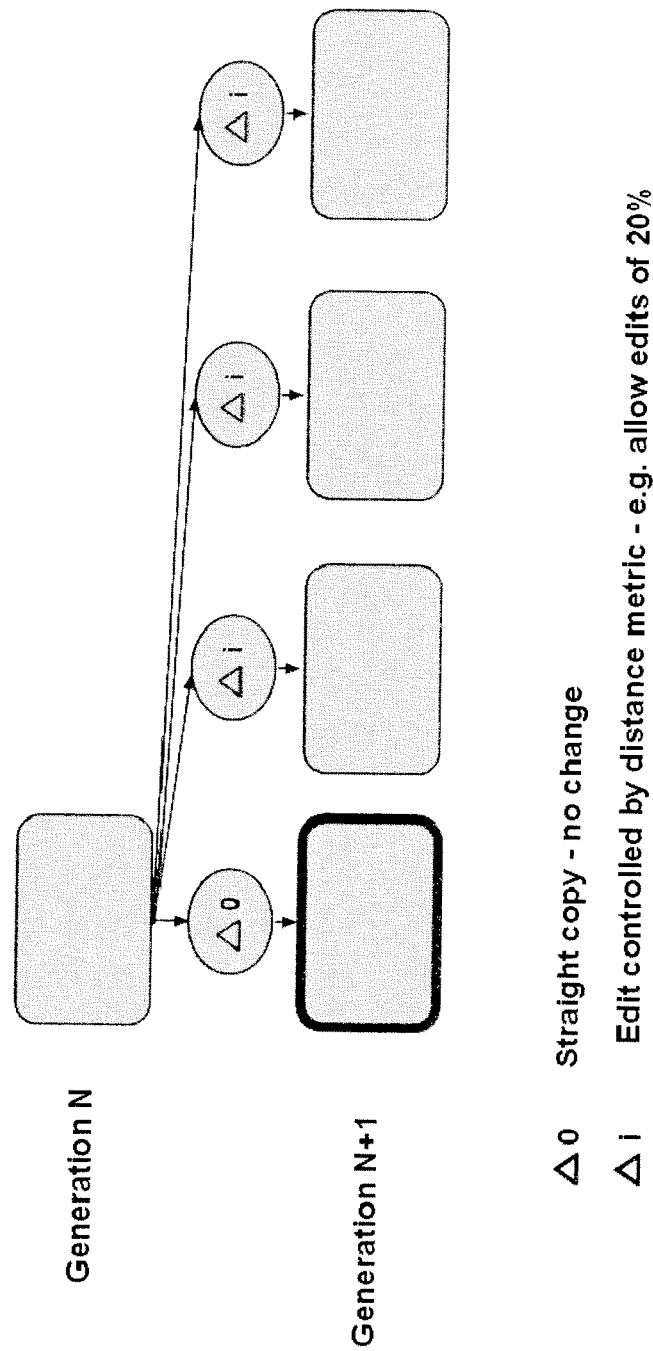
FIG. 2 is an overview of the control mechanism and form of the competing edits in a method according to the present invention.

By pressing the button on the mobile device labelled ('Add Content Item') in FIG. 18, the user is taken to a screen where a new content item can be submitted (FIG. 19). The goal ('What would your ideal Amex Gold Card world be like?') is displayed clearly at the top of the screen 500 on a mobile device 13, 14, or 15. Users attempt to type text which fits the goal. As the text is typed, it is displayed on an editable portion of the screen 500. Basic editing functions are provided: insert character, delete character, cut section of text, copy section of text, paste section of text. Below the editable portion of the screen 500 is an indication of the current number of characters. If the number of characters reaches the 500 character limit, the user is restricted from typing any more characters in the editable portion of the screen 500. However, if previously typed text is deleted, the character limit is updated and further text can be typed in. A SUBMIT button, a RESET button and a CANCEL button are located underneath the editable portion of the screen 500. If the RESET button is pressed, the editable portion of the screen is cleared and a new submission can be made from scratch. If the CANCEL button is pressed, the user is returned to the main screen of the interface 400 without making a submission. If the SUBMIT button is pressed before 200 characters have been typed, a message communicates that the submission is invalid and the user can continue making their submission. If the SUBMIT button is pressed and the number of characters typed is between 200 and 500, the submission is transmitted to the server 11 and stored in the data store 12. The submitted content item is displayed on the interface screen 400 in the list of ranked items. An item that has just been submitted and is yet to receive any votes is ranked after any item that has already been involved in any voting. Each user can add any number of new content item submissions, but they can only have a maximum of 2 content items active at any one time. If a user who already has 2 active content items, attempts to add a 3rd, the new content item will be added and the lowest ranked of their existing 2 content items will be deleted. In the event of a user having both active content items ranked equally, the new content item will replace the oldest. Different implementations may impose different limits to the number of content item submissions one user may have. As soon as a new content item is submitted, it is considered to be 'live' and will be part of the content item voting mechanism (except when there is only one live content item in the system). In this example, the ownership of all content items is tracked as in the first example. A new content item is considered to be 100% owned by the user who submitted it. As edits are promoted, the ownership is updated in a method similar to the first example. As soon as a new content item is submitted, a copy of itself is created as a pending revision in the next generation (see FIG. 2). This is to provide a mechanism for situations where none of the new revisions submitted is considered better than the original version (as in the first example). As the first content items are added, they are ranked according to the date/time they were entered, the most recent first. If the content item is the first content item submitted, it will automatically be ranked first and displayed on the interface 400 shown in FIG. 18 and transmitted to the main screen 100. As votes are cast on content items, the ranking is updated in an order specific to the processing of the results of the voting (see below). Whenever the top ranked content item changes, the new content item is displayed on the main screen 100.

Any content items that have been submitted and are displayed in the interface 400 have a button labelled ('Edit Content Item') underneath. By pressing the button on the mobile device labelled ('Edit Content Item') in FIG. 18 the user is taken to a screen 600 shown in FIG. 20, where a content item can be edited. The goal ('What would your ideal Amex Gold Card world be like?') is displayed clearly at the top of the screen 600 on a mobile device 13, 14, or 15. The live version of the selected content item is displayed in the editable portion of the screen 600 and the number of characters already used is displayed below. Users attempt to edit the text in such a way as to get it closer to the goal. As the text is typed/changed, it is displayed on an editable portion of the screen 600. Below the editable portion of the screen is an indication of the total number of characters in the content item. If the total number of characters reaches the 500 character limit, it is not possible to type any more characters into the editable portion of the screen 600. However, if any text is deleted, the character limit is updated and further text can be typed in.

In addition to the overall character limit, there is a limit to the percentage change that can be made (as measured by the distance metric).

After each edit is made the percentage change is calculated by comparing the unedited state of the text with the latest edited state of the text.

The gzip compression algorithm is used to calculate the Normalized Compression Distance between the unedited state of the text and latest edited state of the text (see FIG. 3).

$$NCD(S(\text{unedited}), S(\text{edited})) = C(S(\text{unedited}), S(\text{edited})) - \min\{C(S(\text{unedited})), C(S(\text{edited}))\}/\max\{C(S(\text{unedited})), C(S(\text{edited}))\}$$

The Normalized Compression Distance as calculated in the above formula returns a number between 0 and 1. In order to display the % change on the screen rounded to two decimal places, we need to format as follows:

$$\% \text{ change} = \text{Round}(NCD(S(\text{unedited}), S(\text{edited}))*100, 2)$$

An example of this calculation for a simple edited string is shown in FIG. 4.

Other implementations might include a semantic distance component in addition (e.g. Google distance).

The percentage change is displayed underneath the editable portion of the screen. A SUBMIT button, a RESET button and a CANCEL button are located underneath the editable portion of the screen 600. If the RESET button is pressed, the editable portion of the screen is returned to the original state before any editing and a new edit can be made from the original state. If the CANCEL button is pressed, the user is returned to the main screen of the interface without making an edit. If the SUBMIT button is pressed and the content item now has fewer than 200 characters or if the change % is still on 0 or if the change % is greater than 20, a message communicates that the edit in its current form is invalid and the user can continue making their edit. If the SUBMIT button is pressed and the number of characters typed is between 200 and 500 and the change percentage is greater than 0 and less than 20, the edit is transmitted to the server 11 and stored in the data store 12. An illustration of the edit control mechanism is shown in FIG. 21. The submitted edit is displayed on the main screen 100 scrolling along underneath the main image. The edit also becomes immediately available for voting. In this example, there can only be 4 edits submitted for voting per iteration of a content item. Each user can only have a maximum of 1 pending edit per content item. Just by being on the edit screen locks one of the 4 available edit slots. Therefore if a content item already has 3 edits submitted and a user clicks on the 'Edit Content Item' button, further users will be prevented from going to the edit screen for that content item. If the user ends up not submitting an edit (or if they leave the mobile device and the edit screen times out—in this example, the timeout is set for 2 minutes of inactivity or 5 minutes overall), the $4^{th}$ edit slot will become available again. If any of the users are on the edit screen and yet to submit and the screen has not timed out, the content item is prevented from being promoted to the next generation. If a promotion had been blocked by an active edit screen and then the edit screen subsequently is cancelled or timed out, the promotion can go ahead. If, on the other hand, the user that had blocked the promotion submits an edit, further pairings of votes are generated and the further votes are then required before the promotion conditions are met (see below).

The method for edit submission and promotion to the live version is similar to the first example. The structure of the edit iterations of each content item takes the general form as illustrated in FIG. 22.

All pending edits generate possible edit voting pairs. If a content item has had no user submitted edits since the last promotion, there will just be the automatically generated clone pending and therefore no pairs available for voting. If there is 1 user submitted edit in an iteration, there will be 1 pair available for voting. If there are 2 user submitted edits in an iteration, there will be 3 pairs available for voting. If there are 3 user submitted edits in an iteration, there will be 6 pairs available for voting. If there are 4 user submitted edits in an iteration (the maximum in this example) there will be 10 pairs available for voting (like in the first example).

In this example, an edit will be chosen for promotion when all pending edits have received a vote from at least 5 different users. The winning edit is determined as the edit that has the highest percentage of wins. As in the first example, in the case of a tie, the winner is chosen randomly from the edits that are tied. In other implementations different rules and thresholds could be applied to determine when promotion occurs.

When a user clicks on the button labelled ('Vote on Edits'), the user will be presented in sequence with all available edit voting pairs generated from all active content items. A user cannot vote on an edit voting pair involving an edit that they have submitted. A user cannot vote on a voting pair which they have already voted on. In this example, the voting pairs are presented in ascending order based on how many votes a voting pair has already received. The screen for voting on edits is represented in FIG. 23. The goal is clearly shown at the top of the screen 700. The main portion of the screen 700 displays the 2 voting choices. The 2 text versions are presented one above the other with the differences between the 2 versions clearly highlighted. At the bottom of the screen is a button labelled 'CANCEL'. If the user presses the 'CANCEL' button, they go back to the main interface screen 400. If the user decides to vote, they select the edit version which best fits the goal. Once the vote has been cast, the system will determine whether the necessary conditions for promotion have been fulfilled (as described above). If so, the user is taken to a screen 710 illustrated by FIG. 24. If not, the user is taken to a screen 720 illustrated by FIG. 25. In each case, the user is given clear feedback as to the effect on the system of their vote. As the vote is cast, the vote is displayed on the main screen 100 scrolling underneath the main image. The user can then vote again by pressing the 'VOTE AGAIN' button or return to the main interface screen 400 by pressing the 'RETURN' button. If there are no more edit votes available for that user, this is clearly displayed on the screen as a message and there is only one button displayed at the bottom of the screen labelled 'RETURN'. Pressing this button returns the user to the main interface screen 400. After any edit is promoted to be the live version of a content item, the ownership is recalculated as in the first example.

When a user clicks on the button labelled ('Vote on Items'), the user will be presented with all available voting pairs of active content items (maximum of 2 active content items per user). These voting pairs will contain the live versions of the content items rather than the pending versions as described in the 'Vote on Edits' description above. This voting is to determine the ranking of the parallel content item developments. Voting pairs involving content items where the user has more than 50% ownership are not presented. Each possible voting pair can be voted on once per user. A voting pair becomes available for voting again for a user in the event that either of the content items has had an edit promoted since the last time that user voted on that pair. Voting pairs are presented to users in descending order according to the average age of the two content items. The age of a content item in this context is the time since it last had an edit promoted or in the event that no edit has been promoted, the time since it was submitted. Ranking of content items is calculated from a user's most recent vote on any pairing. Voting again on a pairing overrides the user's previous vote on that pairing. The screen for voting on content items is represented in FIG. 26. The goal ('What would your ideal Amex Gold Card world be like?') is displayed clearly at the top of the screen 800 on a mobile device 13, 14, or 15. The 2 content item choices are displayed one above the other. At the bottom of the screen 800 is a button labelled 'CANCEL'. If the user presses the 'CANCEL' button, they go back to the main interface screen 400. To vote, the user selects the content item which best fits the goal. As each content item vote is cast, all content items votes are processed to determine an updated content item ranking.

This type of vote based ranking is an example of collaborative ranking (or collaborative filtering) and many algorithms exist which could be used to achieve such collaborative ranking. In this example, the ranking is determined by each content item's percentage of wins in all the vote results from all the users. In other implementations, other algorithms can be used which might take into account factors such as time weighting and weighting based on the consistency of a user's votes. More complex implementations might also employ iterative algorithms which capture the richness of the interconnected voting results. After the vote is cast, the user is taken to a screen 810 illustrated by FIG. 27. The screen 810 gives the user live feedback as to the effect of their vote on the ordering of the content item along with other statistics such as their consistency score and their contribution to the top rated items. As the vote is cast, the vote is displayed on the main screen 100 scrolling underneath the main image. The user can then vote again by pressing the 'VOTE AGAIN' button or return to the main interface screen 400 by pressing the 'RETURN' button.

A flow diagram of the editing and voting process of the second example is shown in FIG. 28.

In the second example, the system could use a variety of strategies to ensure there is a balance between content contributions and votes. For example, a user's content contributions could be down weighted if that user does not maintain a certain level of voting activity and that user's content contributions could be down weighted if their voting does not maintain a certain level of consistency with other users. Constant feedback of consistency information can help keep voting activity honest in situations where the users are performing dual roles as both content contributors and voters.

By encouraging the submission of many content items and developing many in parallel, the probability of finding a very good fit to the goal is increased. This is a strategy to further optimise the traversal and coverage of the search space. In this example, the main screen 100 was set up to track the top rated content item over time. Other public screens could be set up to monitor the evolution of any particular content item, or possibly to cycle between different display modes.

In both examples, the key advances on the prior art are (i) coherent collaborative content creation with large numbers of participants and no moderator (ii) providing a live and concurrent experience; the participants feel they are driving the content development. Further advances are that the system is easy to use and the method is equally applicable to all types of content.

It will be appreciated that the system and method according to the present invention could be implemented with many variations. Alternative implementations of the method according to the present invention can involve richer media types and more sophisticated editors. Some media types might represent a content item as a collection of objects with attributes (position, size, colour, meaning), and the editing process would involve the addition and deletion of these objects and the editing of their attributes. The distance metric could be more sophisticated to be sensitive to semantics, colour and other dimensions.

While in both examples described here, the change restriction has been chosen to be constant, there might be implementations where the change restriction increases or decreases from iteration to iteration.

In an alternative implementation of the second example, content items could optionally be allowed to be edited past the pre-determined limit and entered as new content items.

It will be appreciated that several different strategies can be used to ensure there is a balance between content contributions and votes. These may include different editing/voting schedules such as timed rounds, or having quotas for the number of user submissions, edits and votes at each stage.

Instead of voting in pair choices, other implementations could include choices being made between more than 2 content items or the rating of individual items (e.g. on a scale of 1 to 10).

A simple implementation according to the present invention could be used as a means of correcting small mistakes in content. For example, the goal for textual submissions to a bulletin board could be 'Grammatically correct and no typos'. Another example implementation of the invention could be its use as a tool or widget in conjunction with other tools within a larger collaborative framework. Furthermore, the method could be used within a hierarchical framework of goals. So a text goal of 'Mission statement for Company X' and an image goal of 'Logo for Company X' could be combined for a higher level goal of 'Branding for Company X'. The higher level goal would assess different combinations of the lower level content items.

It will be appreciated that the method according to the present invention could be applied to any content type in any medium wherein the content items can be accurately copied and wherein the copies of the content items can be edited, and where the amount of change can be measured and controlled in terms of a distance metric (such as Normalized Compression Distance). Furthermore, the goal has to be such that any content item (or derivative) can be assessed efficiently with respect to it.

As may be inferred from the above examples, the present invention provides an iterative method for coherent goal directed collaboration, without the need for a moderator. The method is easy to use and engaging. It also has the advantage of making it easier for less prolific users to contribute. For example, users can develop someone else's submission rather than submit a completely new item. This encourages cross-fertilization of ideas and the end product achieved by this method is richer than the sum of each individual's contribution. The content generated with the method according to the present invention is representative of the participants' ideas or insights and allows for real-time completion. The distance metric approach to controlling the size of user edits ensures an efficient and fair development of content even when there are large numbers of concurrent users.

Given its advantages, the system and method according to the present invention may be used in many applications. These may include focus groups, customer insight, product development, logo development, market testing, brainstorming, employee think-tanks, music development, collaborative crime scene reconstruction, general entertainment, collaborative art projects, educational projects, and community projects.

The invention claimed is:

1. An iterative method for a plurality of users to concurrently edit at least one digital file to achieve a predetermined goal, each iteration comprising the steps of:
    creating a copy of the at least one digital file for each user;
    enabling at least one user to create at least one altered digital file by making a change to the copy of the at least one digital file, wherein the magnitude of the change is within predetermined limits;
    receiving at least one altered digital file;
    creating a voting set containing a plurality of digital files, the plurality of digital files including at least one altered digital file or at least one unaltered digital file;
    enabling at least one user to cast a vote in relation to the digital files in the voting set;
    receiving a vote cast by said at least one user in relation to the digital files in the voting set;
    repeating the steps of creating a voting set and enabling at least one user to cast a vote until at least one of the digital files in one of the voting sets receives a number of votes above a predetermined voting threshold; and
    including in the next iteration the at least one digital file which received a number of votes above a predetermined voting threshold;
    wherein the predetermined limits of the magnitude of change are determined by a distance metric, the distance metric being a function of an estimation of the information distance between the unedited and edited state of the at least one digital file.

2. An iterative method according to claim 1, wherein the predetermined limits of the magnitude of change is a function of the Normalized Compression Distance between the unedited and edited state of the at least one digital file.

3. An iterative method according to claim 1, wherein enabling at least one user to cast a vote comprises enabling the at least one user to rate each item in the voting set.

4. An iterative method according to claim 1, wherein each of the steps of enabling at least one user to create at least one altered digital file and enabling at least one user to cast a vote further comprises presenting the goal to the at least one user.

5. An iterative method according to claim 1, wherein the number of digital files included in the next iteration does not exceed a predetermined file limit.

6. An iterative method according to claim 1, wherein the voting set contains a predetermined number of digital files.

7. An iterative method according to claim 1, wherein at least one user is enabled to create only one altered digital file.

8. An iterative method according to claim 1, wherein each iteration further comprises the step of redefining the predetermined goal.

9. An iterative method according to claim 8, wherein each iteration further comprises the step of redefining the predetermined voting threshold.

10. An iterative method according to claim 1, wherein each iteration further comprises the step of redefining the predetermined limits.

11. An iterative method according to claim 1, wherein enabling at least one user to create at least one altered digital file is performed within predetermined editing time limits.

12. An iterative method according to claim 1, wherein enabling at least one user to cast a vote is performed within predetermined voting time limits.

13. An iterative method according to claim 1, further including the step of generating a number of parallel digital files using the steps of claim 1 and ranking said parallel digital files via a system of collaborative ranking.

14. An iterative method according to claim 1, further including the step of generating a number of parallel digital files created by combining a number of digital files using the steps of claim 1 and ranking said number of parallel digital files via a system of collaborative ranking.

15. A system for a plurality of users to concurrently and iteratively edit at least one digital file to achieve a predetermined goal, the system comprising:
    means for creating a copy of the at least one digital file for each user; means for enabling at least one user to create at least one altered digital file by making a change to the copy of the at least one digital file, wherein the magnitude of the change is within predetermined limits;
    means for receiving at least one altered digital file;
    means for creating a voting set containing a plurality of digital files, the plurality of digital files including at least one altered digital file or at least one unaltered digital file;

means for receiving a vote cast by said at least one user in relation to the digital files in the voting set;

means for enabling at least one user to cast a vote in relation to the digital files in the voting set; and means for identifying the digital files which receive a number of votes above a predetermined voting threshold;

wherein the predetermined limits of the magnitude of change are determined by a distance metric, the distance metric being a function of an estimation of the information distance between the unedited and edited state of the at least one digital file.

* * * * *